(12) United States Patent
Watanabe et al.

(10) Patent No.: US 6,795,439 B2
(45) Date of Patent: Sep. 21, 2004

(54) NETWORK SYSTEM

(75) Inventors: Yoshihiro Watanabe, Kawasaki (JP); Taisuke Sasaki, Kawasaki (JP)

(73) Assignee: Fujitsu Limited, Kanagawa (JP)

( * ) Notice: Subject to any disclaimer, the term of this patent is extended or adjusted under 35 U.S.C. 154(b) by 753 days.

(21) Appl. No.: 09/759,175

(22) Filed: Jan. 12, 2001

(65) Prior Publication Data
US 2003/0189926 A1 Oct. 9, 2003

(30) Foreign Application Priority Data
May 8, 2000 (JP) ........................................ 2000-135083

(51) Int. Cl.[7] .............................................. H04L 12/28
(52) U.S. Cl. ..................... 370/395.2; 370/389; 370/400
(58) Field of Search ................................ 370/248, 254, 370/395.1, 395.2, 395.21, 395.53, 400

(56) References Cited

U.S. PATENT DOCUMENTS

| | | | | |
|---|---|---|---|---|
| 5,761,192 A | * | 6/1998 | Hummel ...................... | 370/254 |
| 5,930,238 A | * | 7/1999 | Nguyen ................. | 370/395.53 |
| 5,949,782 A | * | 9/1999 | Wells ....................... | 370/395.2 |
| 5,953,338 A | * | 9/1999 | Ma et al. ................ | 370/395.21 |
| 6,636,484 B1 | * | 10/2003 | Agrawal et al. ............ | 370/248 |
| 2003/0016675 A1 | * | 1/2003 | Underwood ............. | 370/395.1 |

FOREIGN PATENT DOCUMENTS

JP 10023021 1/1998

OTHER PUBLICATIONS

Japanese Literature entitled "Nikkei Communications", Oct. 18, 1999, p. 101 with explanation of Figure 6.

* cited by examiner

*Primary Examiner*—Salvatore Cangialosi

(57) ABSTRACT

A NMS for controlling the network provides a SoftPVC connection request comprising information associated with a specified relay node to a call-out node, when setting a path passing through the specified relay node. The call-out node prepares a SETUP message comprising information associated with the specified relay node, and transmits the message to nodes existing on the post stage. Thereafter, the SETUP message reaches the call-in node through the specified relay node, to thereby perform the signaling procedure, and as a result, a path from the call-out node to the call-in node passing through the specified relay node is set and established.

16 Claims, 27 Drawing Sheets

FIG. 21

TABLE

| Connection No. | CONNECTION ROUTE INFORMATION INPUT LINE NUMBER/OUTPUT LINE NUMBER | CALL-OUT NODE | CALL-OUT SIDE LINE NUMBER AND VPI/VCI | CALL-IN NODE | CALL-IN SIDE LINE NUMBER AND VPI/VCI |
|---|---|---|---|---|---|
| 1 | INPUT: Plyi/OUTPUT: Plyo | A | PL15/0/32 | D | PL10/0/32 |
| 2 | INPUT: Plyi/OUTPUT: Plyo | B | PL03/0/33 | E | PL01/01/32 |
| ---- | ---- | ---- | ---- | ---- | ---- |

PATH INFORMATION DB

| CONTROL NO. | CALL-OUT NODE | CALL-OUT SIDE LINE NUMBER AND VPI/VCI | CALL-IN NODE | CALL-IN SIDE LINE NUMBER AND VPI/VCI | CONNECTION ROUTE INFORMATION STATION CODE : INPUT LINE NUMBER /OUTPUT LINE NUMBER |
|---|---|---|---|---|---|
| 1 | A | PL15/0/32 | D | PL10/0/32 | A:Plxo→B:Plyi/Plyo →C:Plzi/Plzo→D:Plwi |
| 2 | B | PL03/0/33 | E | PL01/01/32 | B:Plao→A:Plbi/Plbo →E:Plci |
| ---- | ---- | ---- | ---- | ---- | ---- |

NETWORK SYSTEM

BACKGROUND OF THE INVENTION

1. Field of the Invention

The present invention relates to a network system such as STM (Synchronous Transfer Mode) and ATM (Asynchronous Transfer Mode), and more specifically, relates to a technique for setting a path in the network.

2. Description of the Related Art

With the STM and ATM network, connection is preset, and data (cell) is transmitted on the preset connection. As the connection, there are PVC (Permanent Virtual Connection) and SVC (Switched Virtual Connection).

The PVC is a connection fixedly set between nodes, and is set when an manager (operator) of network uses it for a medium or long term like a private line, depending on the application of the network. The PVC is set by a manual operation of the manager (the operator inputs the necessary information to a node (switching station) by hand).

The SVC is a dynamic virtual connection. When an address of destination is specified, an relay route is selected by signaling thereby dynamically set the channel. By using the SVC, the connection can be set without relying on the manual operation of the operator, the connection can be released when the connection is not used, and the route can be also reselected in accordance with the network condition.

Recently, as one of new connections, there is SoftPVC. The SoftPVC is recommended in the ITU-T Q.2961 or in the Private Network-Network Interface Specification Version 1.0 (PNNI 1.0) of the ATM Forum Technical Committee.

With the SoftPVC, a computer referred to as "Network Management System" (NMS) that functions as a control unit of the STM or ATM network transmits point information indicating an initial point (call-out node) and a terminal point (call-in node) of the path to the call-out node. Then, a path from the call-out node to the call-in node is set by the similar signaling procedure as in the SVC.

As described above, with the conventional SoftPVC, by specifying the point information of the call-out node and the call-in node, the path between these nodes (connection) is automatically set. As a result, it is not necessary for the operator to input manually the information associated with the path to the call-out node, the call-in node and the relay node between these. Hence, the connection time of the path can be shortened.

With the conventional SoftPVC, the NMS notifies only the point information of the call-out node and the call-in node to the call-out node, and the call-out node sets the path from the call-out node to the call-in node by the similar signaling procedure as in the SVC, using the point code of the call-in node (telephone number of the call-in node, and the channel information of the call-in node (VCI/VPI, channel number or the like)) included in the notified point information.

With this method, only the point information of the call-out node and the call-in node is provided to the call-out node, as the point information for signaling. Therefore, if there are a plurality of routes from the call-out node via an relay node to the call-in node, an optional route in accordance with the selection algorithm of the route preset in the relay node is automatically selected from the plurality of routes.

As a result, with the conventional SoftPVC, a path from the call-out node to the call-in node passing through a specific point that the network manager intends to use cannot be set. On the contrary, it is also not possible to set a path from the call-out node to the call-in node, without passing through a specific point. That is to say, with the conventional SoftPVC, it is not possible to select a route that the network manager wants to use to set a path.

Therefore, paths may be concentrated on a certain node, depending upon the selection algorithm of the relay node, causing a problem in that load is concentrated on that node. Moreover, even if maintenance work for the node and the transmission line (channel) is required, a path avoiding the node and the transmission line to be subjected to the maintenance work cannot be set by the SoftPVC.

SUMMARY OF THE INVENTION

It is an object of the present invention to provide a network system that can set a path from a call-out node to a call-in node in a desired route by signaling.

In order to achieve the above object, the present invention has a construction described below. That is to say, the present invention is a network system comprising a network having a plurality of nodes and having a plurality of routes from a call-out node via an relay node to a call-in node, and a control unit for this network. When the call-out node and the call-in node are connected, passing through at least one node, the control unit provides to the call-out node a path connection request having node information stored therein, comprising: information associated with the call-out node; information associated with the call-in node; and information associated with a specified relay node specified as a node for the path to pass therethrough. Upon reception of the path connection request from the control unit, the call-out node generates a path connection start request comprising the node information in the path connection request, and transmits the path connection start request to the adjacent node so that the specified relay node receives the path connection start request, based on the information associated with the specified relay node, as well as setting a path with the adjacent node. Upon reception of the path connection start request, if there is a specified relay node which has not received the path connection start request, the above-described each node transmits the path connection start request to the adjacent node so that the aforesaid specified relay node receives the path connection start request, based on the information associated with the specified relay node. If all of the specified relay nodes have received the path connection start request, each node transmits the path connection start request to the adjacent node so that the call-in node receives the path connection start request based on the information associated with the call-in node, to thereby set a path with the adjacent node that has transmitted the path connection start request.

According to the present invention, since the path connection start request (SETUP message) reaches to the call-in node from the call-out node through the specified relay node by means of the above operation, a path passing through the specified relay node can be set by the signaling procedure.

Moreover, the present invention is a network system comprising a network having a plurality of nodes and having a plurality of routes from a call-out node via an relay node to a call-in node, and a control unit for this network. When the call-out node and the call-in node are connected without passing through at least one specific node, the control unit provides to the call-out node a path connection request having node information stored therein, comprising: information associated with the call-out node; information associated with the call-in node; and information associated with a specified non-passage node specified as a specific node through which the path does not pass. Upon reception of the path connection request from the control unit, the call-out node generates a path connection start request comprising the node information in the path connection request, and transmits the path connection start request to the adjacent node that does not correspond to the specified non-passage node based on the information associated with the specified non-passage node, as well as setting a path with the adjacent node. Upon reception of the path connection start request, if there is an adjacent node corresponding to the call-in node, the above described each node transmits the path connection start request to the adjacent node. If there is an adjacent node that does not correspond to the call-in node and the specified non-passage node, each node transmits the path connection start request to the adjacent node, and sets a path with the adjacent node that has transmitted the path connection start request.

According to the present invention, since the path connection start request (SETUP message) reaches the call-in node from the call-out node without passing through the specified non-passage node, a path that does not pass through the specified non-passage node can be set by the signaling procedure.

With the present invention, the aforesaid management unit can obtain the information associated with a path set from a call-out node to a call-in node from the network. The information associated with the path is, for example, connection information of each relay node (output line information, or input line information and output line information associated with the path).

Moreover, with the present invention, in the case of changing the set path, the management unit provides to the call-out node a path changeover request having alternative node information stored therein, comprising information associated with the call-out node; information associated with the call-in node; and information associated with a specified relay node of an alternative path. The call-out node cuts off the set path by transmitting a release message towards the call-in node, and prepares a path connection start request of the alternative path comprising the alternative node information. The respective nodes comprising the call-out node execute the processing according to a first aspect in response to the path connection start request of the alternative path, to thereby set the alternative path passing through a specified relay node.

In this manner, an old path may be cut off by a single instruction from the management unit and a new path (alternative path) passing through a specified relay node may be set, that is, the path can be changed.

Furthermore, with the present invention, in the case of changing the set path, the management unit provides to the call-out node a path changeover request having alternative node information stored therein, comprising information associated with the call-out node; information associated with the call-in node; and information associated with a specified non-passage node of the alternative path. The call-out node cuts off the set path by transmitting a release message towards the call-in node, and prepares a path connection start request of the alternative path comprising the alternative node information. The respective nodes comprising the call-out node execute the processing according to a fourth aspect in response to the path connection start request of the alternative path, to thereby set the alternative path which does not pass through a specified non-passage node.

In this manner, an old path may be cut off by a single instruction from the management unit and a new path (alternative path) which does not pass through a specified non-passage node may be set, that is, the path can be changed.

BRIEF DESCRIPTION OF THE DRAWINGS

FIG. 21 is a diagram of a table held by the ATM node in a sixth embodiment;

FIG. 22 is a diagram of a path information database held by the NMS in a seventh embodiment;

DESCRIPTION OF THE PREFERRED EMBODIMENTS

Embodiments of the present invention will now be described in detail with reference to drawings.

[First Embodiment]
(Network Construction)

Figure 1:
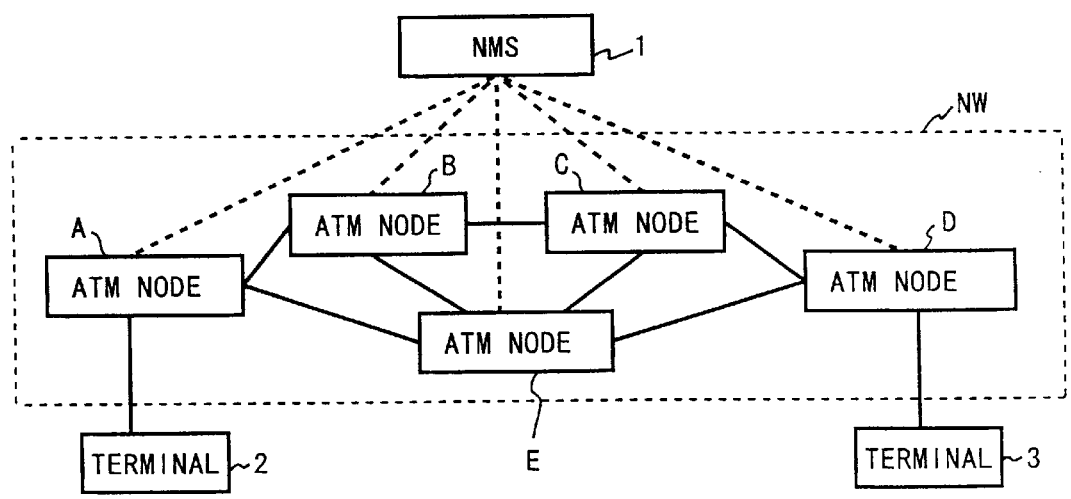
FIG. 1 is a diagram showing an example of a network construction of a network system.

FIG. 1 is a diagram showing an example of a network construction of a network system according to an embodiment of the present invention. In FIG. 1, the network NW is an ATM network, and has ATM nodes (switching stations) A to E.

The ATM node A is connected to each ATM node B, E through a physical channel. The ATM node B is connected to each ATM node C, E through a physical channel. The ATM node C is connected to each ATM node D, E through a physical channel. The ATM node D is connected to the ATM node E through a physical channel.

Moreover, the network NW is connected with a NMS 1. The NMS 1 is connected to each ATM node A to E through a communication channel. The NMS 1 controls a path setting by means of the SoftPVC in the network NW. The NMS 1 corresponds to the control unit of the present invention.

The network NW is also connected with each terminal unit 2, 3. The terminal unit 2 is connected with the ATM node A through a communication line. The terminal unit 3 is connected with the ATM node D through a communication line. (Construction of the NMS)

Figure 2:
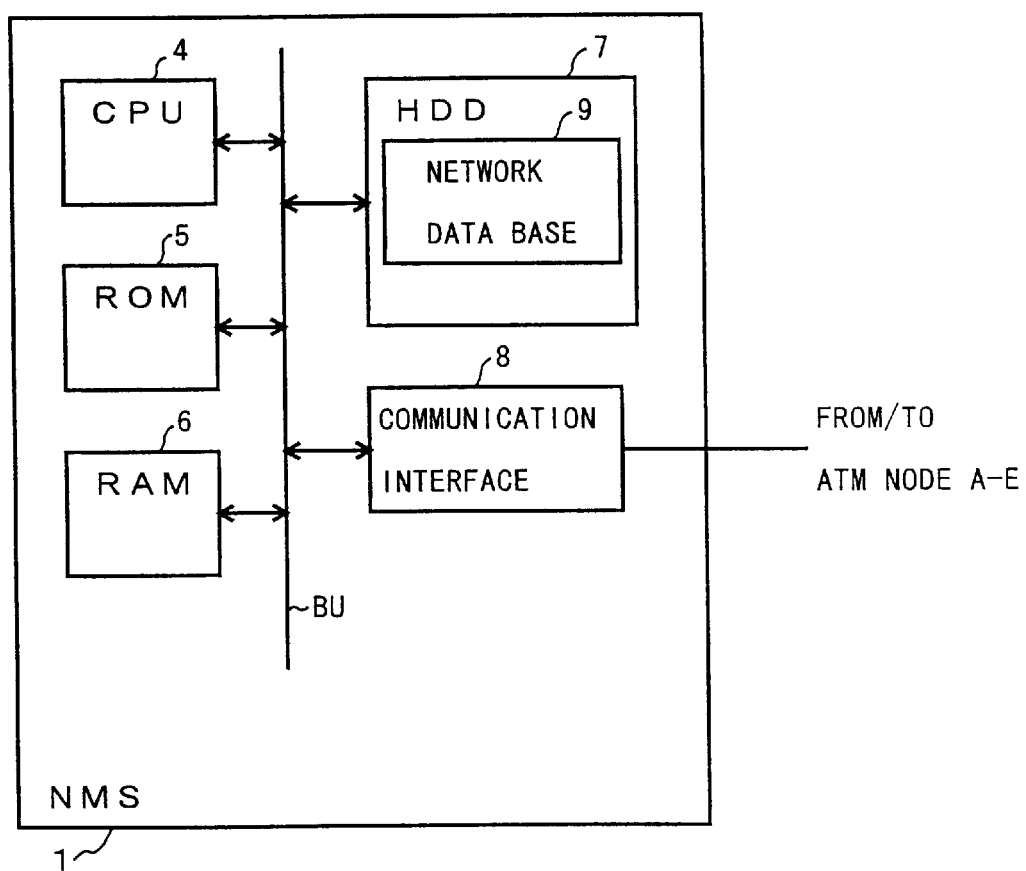
FIG. 2 is a block diagram of the NMS shown in FIG. 1.

FIG. 2 is a block diagram of the NMS 1 shown in FIG. 1. The NMS 1 is a computer comprising CPU 4, ROM 5, RAM 6, HDD (Hard Disc Drive) 7 and communication interface (communication I/F) 8 connected via a bus BU.

The HDD 7 holds programs executed by the CPU 4, data used at the time of executing the program, or the like. For example, the HDD 7 holds network database (network DB) 9. The network DB 9 stores topological information as information associated with the topology of the network NW.

The network DB 9 holds, as a part of the topological information, station codes of each ATM node A to E, line number, VPI/VCI (Virtual Path Identifier/Virtual Channel Identifier), or the like. These data is used as path setting information in the network NW. The path setting information is information associated with the path setting by the SoftPVC. Here, VPI/VCI is an identifier of a virtual path (VP)/virtual channel (VC), respectively.

The CPU 4 controls path setting by means of the SoftPVC in the network NW, by loading the program held in the ROM 5 or HDD 7 to the RAM 6 and executing the program.

The communication I/F 8 accommodates communication lines connected to each ATM node A to E, and performs data transfer processing between each ATM node A to E and the NMS 1.
(Construction of the ATM Node)

Figure 3:
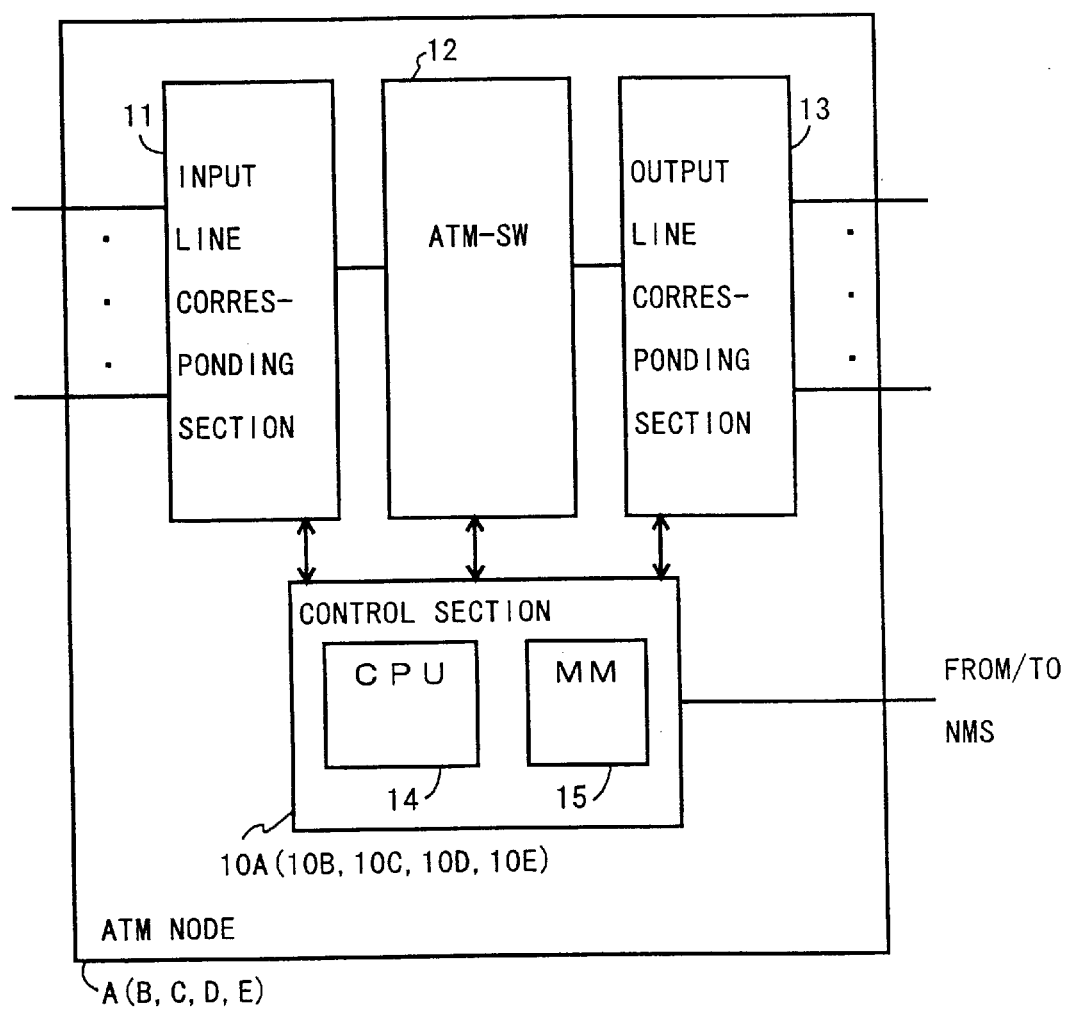
FIG. 3 is a block diagram of the ATM node shown in FIG. 1.

FIG. 3 is a block diagram of each ATM node A to E shown in FIG. 1. Since each ATM node A to E has the same construction, the ATM node A is taken as an example, and explained herein. The ATM node A comprises a control section 10A, an input line corresponding section 11, an ATM switch (ATM-SW) 12, and an output line corresponding section 13.

The control section 10A comprises a CPU 14, a main memory (MM) 15, a storage medium (not shown), a communication control unit (not shown) or the like, and controls the operation of the ATM node A by executing a program held in the storage medium.

For example, the control section 10A controls signaling associated with the path setting by means of the SoftPVC in accordance with an instruction from the NMS 1. Therefore, the control section 10A accommodates a communication line connected to the NMS 1 to thereby perform data transfer with the NMS 1.

Moreover, the control section 10A holds topological information of the network NW, and can specify an adjacent node with which a path should be set, at the time of setting of the SVC and SoftPVC.
(Processing of the NMS)

Figure 4:
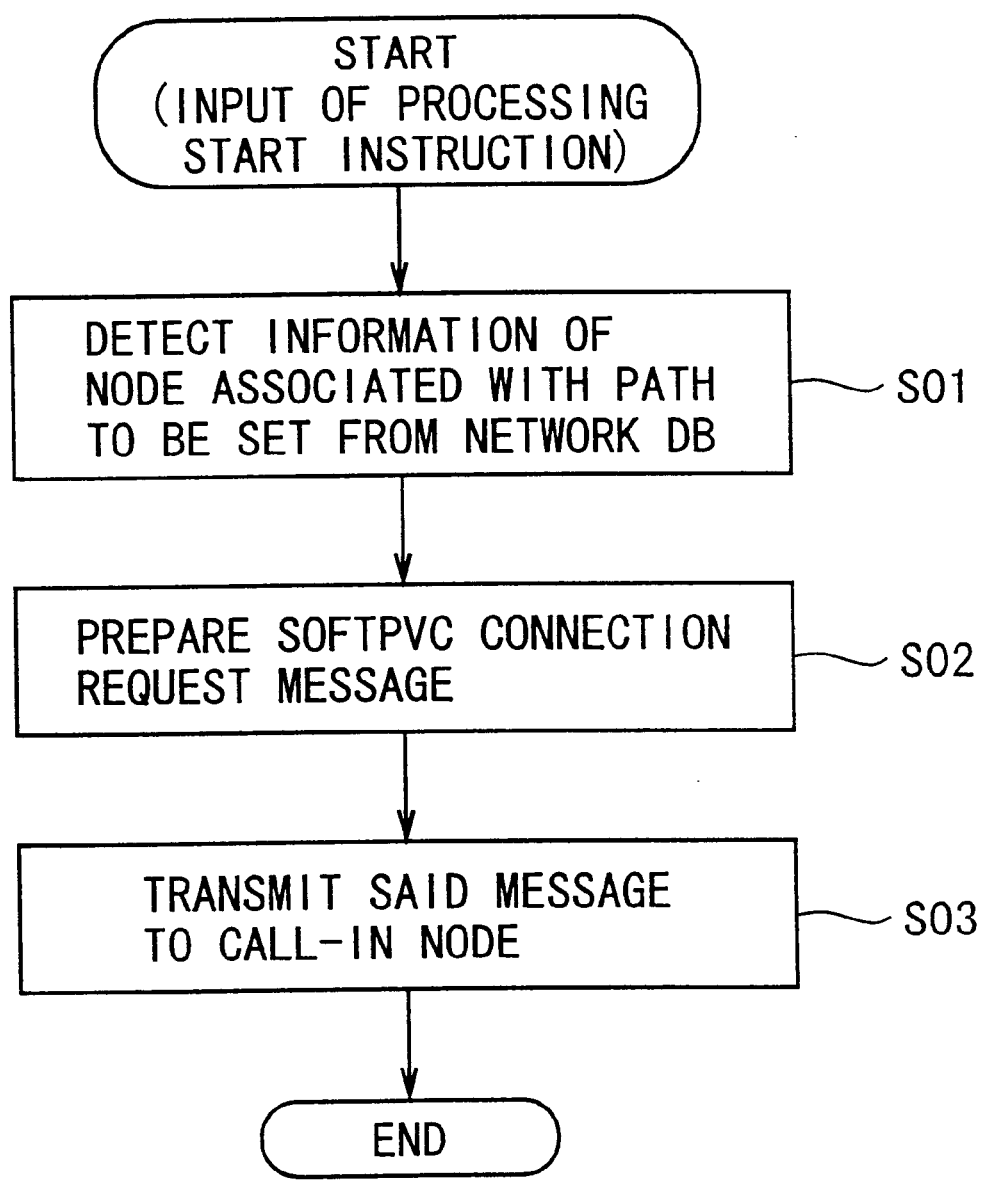
FIG. 4 is a flowchart showing a processing of the NMS in a first embodiment.

FIG. 4 is a flowchart showing processing (processing of the SoftPVC connection request) of the NMS 1 in a first embodiment. The processing shown in FIG. 4 starts, for example, when a manager or a maintenance personnel of the network NW inputs an instruction of the concerned processing to the NMS 1.

In FIG. 4, in the step S01, the CPU 2 reads out call-out point code information, call-in point code information and passage relay node information associated with the concerned path from the network DB 9 of the HDD 7 to the RAM 4, as the node information associated with the path to be set according to the instruction. Thereafter, the processing proceeds to the step S02. Here, the call-out point code information corresponds to the "information associated with the call-out node", the call-in point code information corresponds to the "information associated with the "call-in node", and the passage relay node information corresponds to the "information associated with the specified relay node" of the present invention, respectively.

Figure 5:
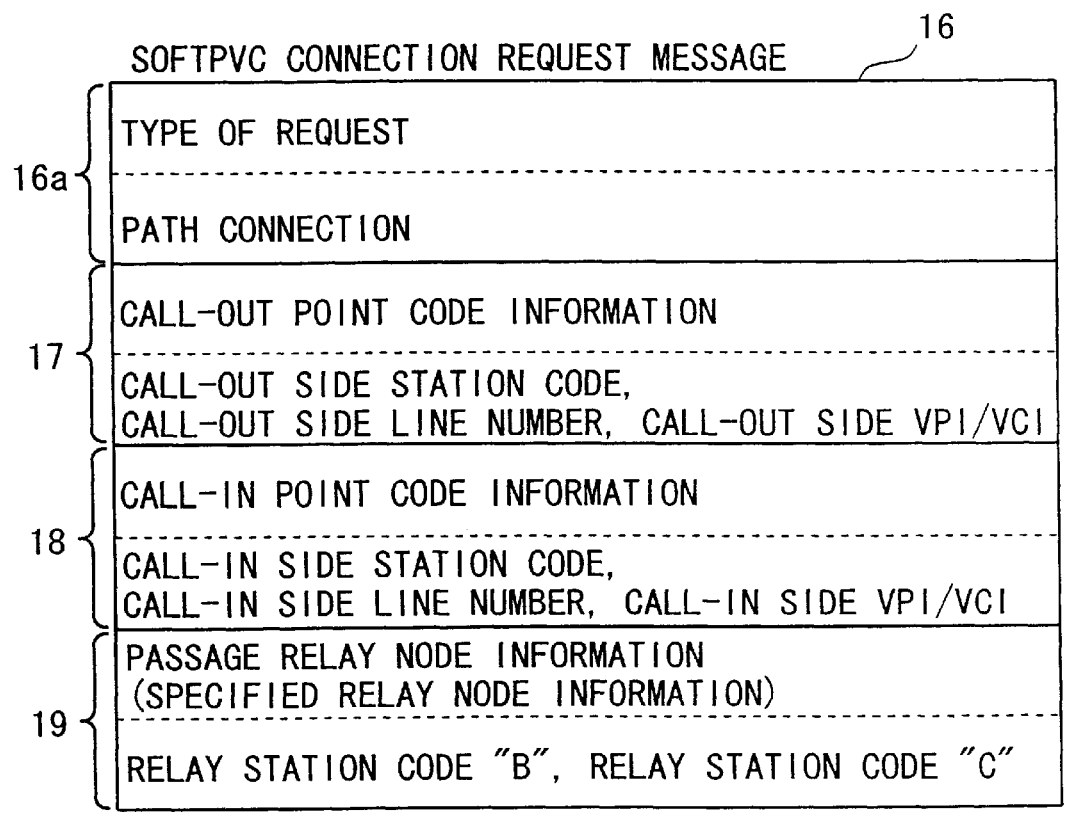
FIG. 5 is a format diagram of a SoftPVC connection request message in the first embodiment.

In the step S02, the CPU 2 prepares a SoftPVC connection request message 16, using the information of each node read out to the RAM 4. This SoftPVC connection request message corresponds to the "path connection request". FIG. 5 is a format diagram of the message 16. The message 16 has fields 16a, 17, 18 and 19 for storing the node information.

A kind of request of the message 16 is stored in the field 16a. That is to say, in the field 16a, "path connection" indicating the path connection request of the SoftPVC is stored as the kind of the request.

The call-out point code information is stored in the field 17. The call-out point code information comprises a call-out side station code, a call-out side line number, and call-out side VPI/VCI. The call-out side station code is a station code (point code) as the specific information of the call-out node. The call-out line number is a line number of the call-out node, and the call-out VPI/VCI is the VPI/VCI of the call-out node.

The call-in point code information is stored in the field 18. The call-in point code information comprises a call-inside station code, a call-in side line number, and call-in side VPI/VCI.

The passage relay node information is stored in the field 19 as the specified relay node information. The passage relay node information comprises specific information of at least one ATM node specified as the relay node of a path to be set. The respective specific information is an relay station code as a station code of the ATM node corresponding to the relay node. When a plurality of relay station codes are stored in the field 19, the relay station codes are stored in the order of passage from the call-out node to the call-in node.

Storing the passage relay node information in the field 19 is the new part in the present invention. Therefore, when the SoftPVC is set without specifying the relay node, a SoftPVC connection request message which does not include the passage relay node information is prepared and transmitted to the call-out node.

In the step S02, the CPU 2 stores the node information corresponding to each field 16a, 17, 18 and 19 of the message 16, respectively. Then, the operation proceeds to the step S03.

In the step S03, the CPU 2 transmits the prepared Soft-PVC connection request message 16 to the ATM node corresponding to the call-out node. Thereafter, the operation by the NMS 1 is completed.

(Processing of the Call-Out Node)

When receiving the message 16 from the NMS 1, each ATM node A to E functions as the call-out node in the SoftPVC. At this time, the control section of the call-out node (see FIG. 3) executes the program associated with the path setting signaling by means of the SoftPVC, designating the reception of the message 16 as a trigger, and executes the processing shown in FIG. 6.

Figure 6:
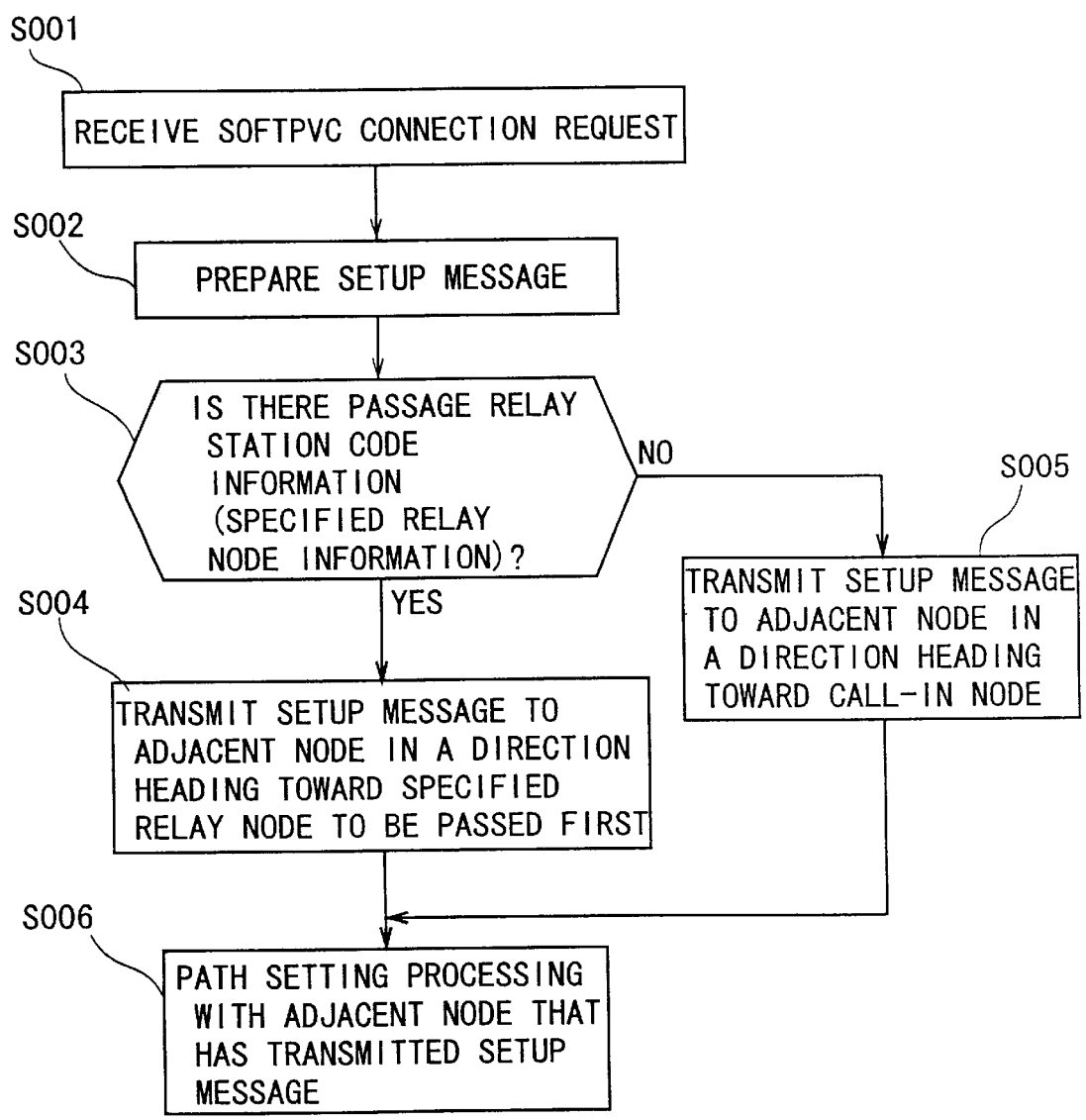
FIG. 6 is a flowchart for explaining the operation of a call-out node in the first embodiment.

FIG. 6 is a flowchart for explaining the operation (processing) of the call-out node in the first embodiment. An example in which the ATM node A functions as the call-out node will be described here.

In FIG. 6, when the call-out node receives the SoftPVC connection request message 16 (step S001), the control section 10A prepares a SETUP message (corresponding to the path connection start request) 20 as a SoftPVC setting request, based on the message 16 (step S002).

Figure 7:
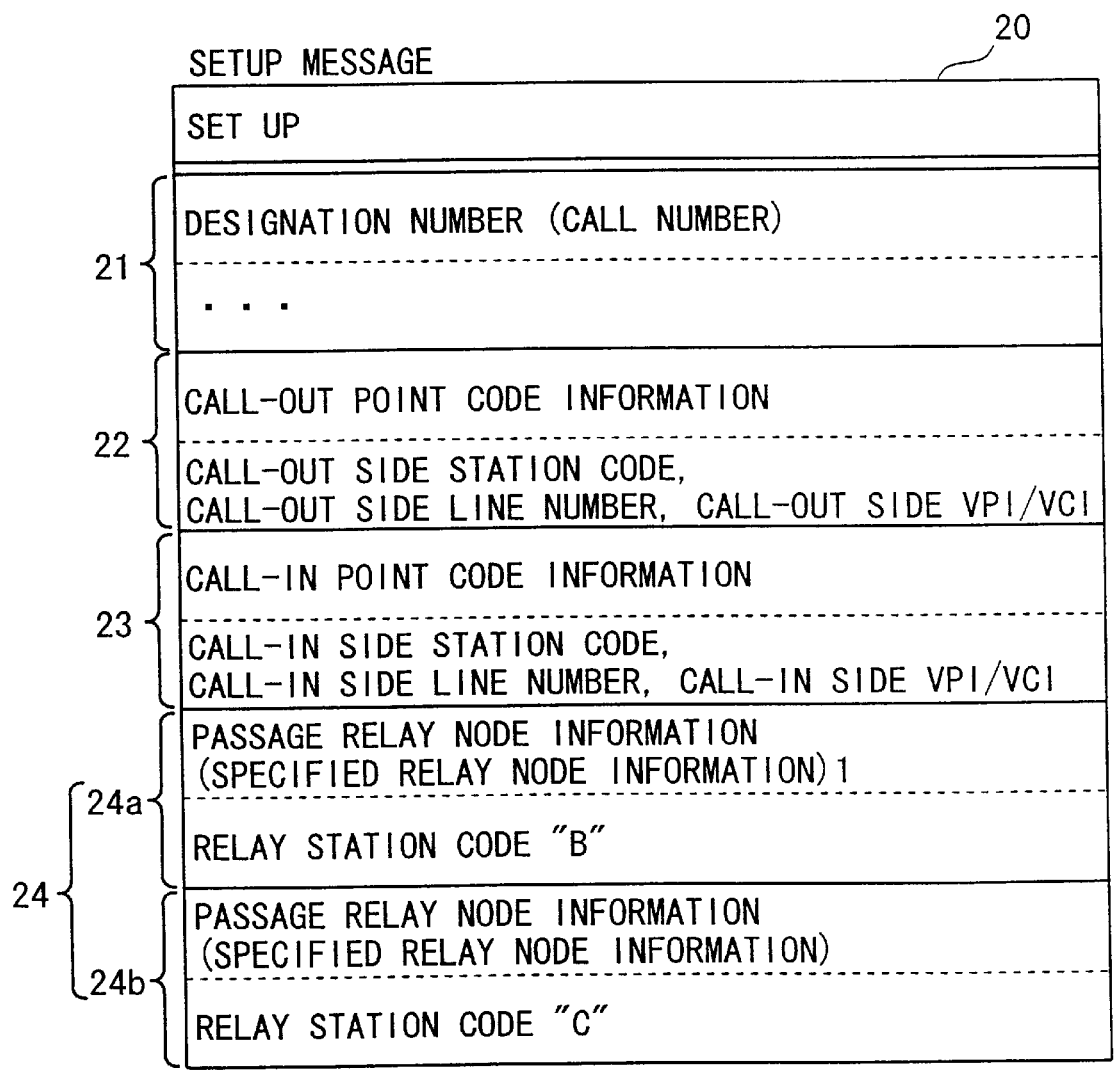
FIG. 7 is a format diagram of a SETUP message in the first embodiment.

FIG. 7 is a format diagram of the SETUP message 20. The SETUP message 20 has a plurality of fields 21 to 24. A designation number of the path to be set is stored in the field 21.

In the field 22, there is stored the call-out point code information stored in the field 17 of the message 16. The call-in point code information stored in the field 18 of the message 16 is also stored in the field 23.

The field 24 has areas of a number corresponding to the number of relay station codes stored in the field 19 of the message 16. Each area stores one relay station code.

Figure 16:
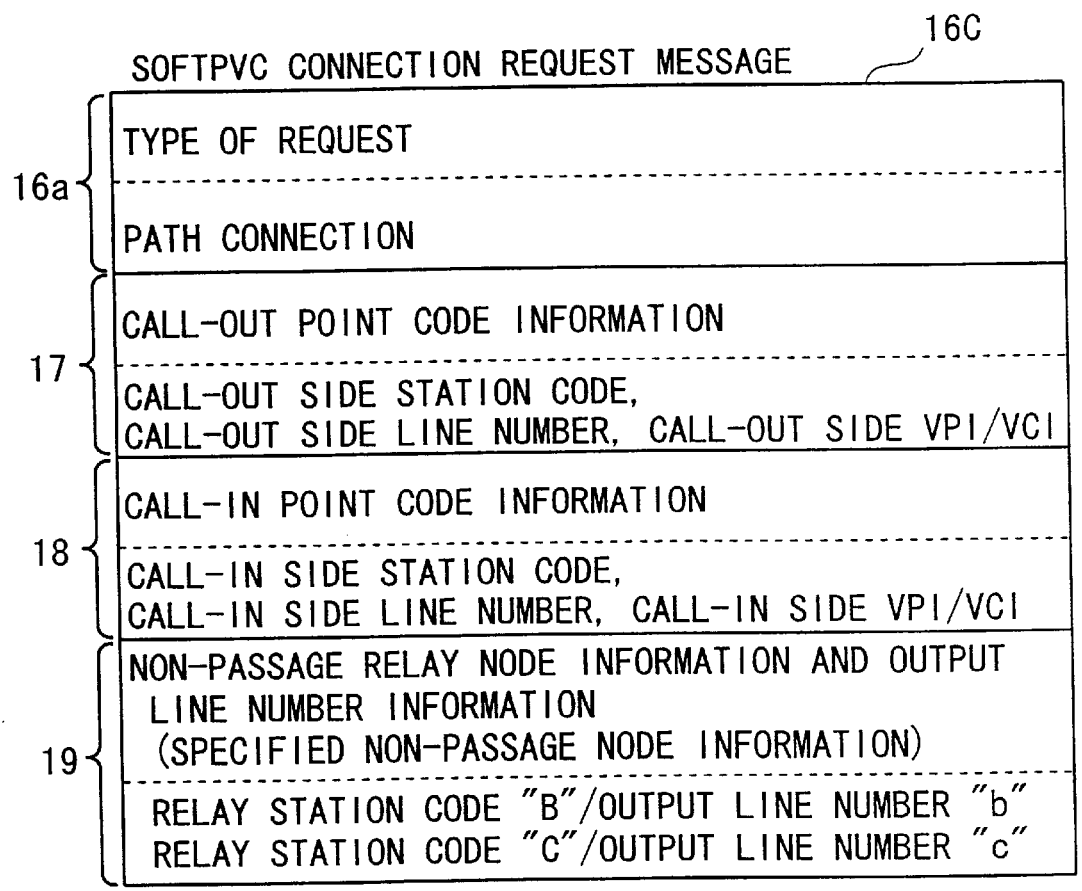
FIG. 16 is a format diagram of a SoftPVC connection request message in a fourth embodiment.

For example, when two relay station codes are stored in the field 19, as shown in FIG. 16, there are provided an area 24a and an area 24b. In each area 24a, 24b, there is stored the relay station code as the specified relay node information. At this time, each relay station code is stored in each area in the order of passage in the route coming from the call-out node to the call-in node.

Here, the construction may be such that storage areas for a plurality of relay station codes are prepared in advance in the field 24, by dividing the field 24 into optional number of areas in advance, instead of the construction of the field 24 described above. In this case, the area not to be used becomes a free area.

In the step S002, the control section 10A sets a predetermined designation number to the field 21 of the SETUP message 20, upon reception of the message 16. Thereafter, the control section 10A pads the call-out point code information, call-in point code information and passage relay node information in the message 16 into each field 22, 23, 24 of the SETUP message 20, respectively. Thereafter, the processing proceeds to the step S003.

In the step S003, the control section 10A judges whether there is passage relay station code information (specified relay node information) or not in the prepared SETUP message 20. At this time, if there is the specified relay node information, the processing proceeds to the step S004, and if not, the processing proceeds to the step S005.

In the step S004, the control section 10A specifies and selects a direction (route) heading toward the specified relay node to be passed first, based on the relay station code in the specified relay node information and the topological information in the network NW held in advance. The control section 10A transmits the SETUP message 20 to the adjacent node existing on the selected route. Thereafter, the processing proceeds to the step S006.

In the step S005, the control section 10A judges that a passage relay node is not specified with respect to the path setting of the concerned SoftPVC, and specifies and selects a direction (route) heading toward the call-in node, based on the call-in point code information in the SETUP message 20 and the topological information in the network NW. Thereafter, the processing proceeds to the step S006.

In the step S006, the path setting processing (signaling) is executed between the call-out node and the above-described adjacent node. Thereby, a path is set between the call-out node and the adjacent node. The path has one or more connections. Signaling is similar as that of the conventional SoftPVC.

In addition, the order of the transmission processing (step S004, S005) of the SETUP message 20 and the path setting processing (S006) may be reversed.

(Processing of the Relay Node)

When the SETUP message 20 is dispatched from the call-out node, the dispatched SETUP message 20 is transmitted to the call-in node via a single or a plurality of relay node(s). That is to say, each ATM node A to E functions as the relay node in the set path, upon reception of the SETUP message 20.

Figure 8:
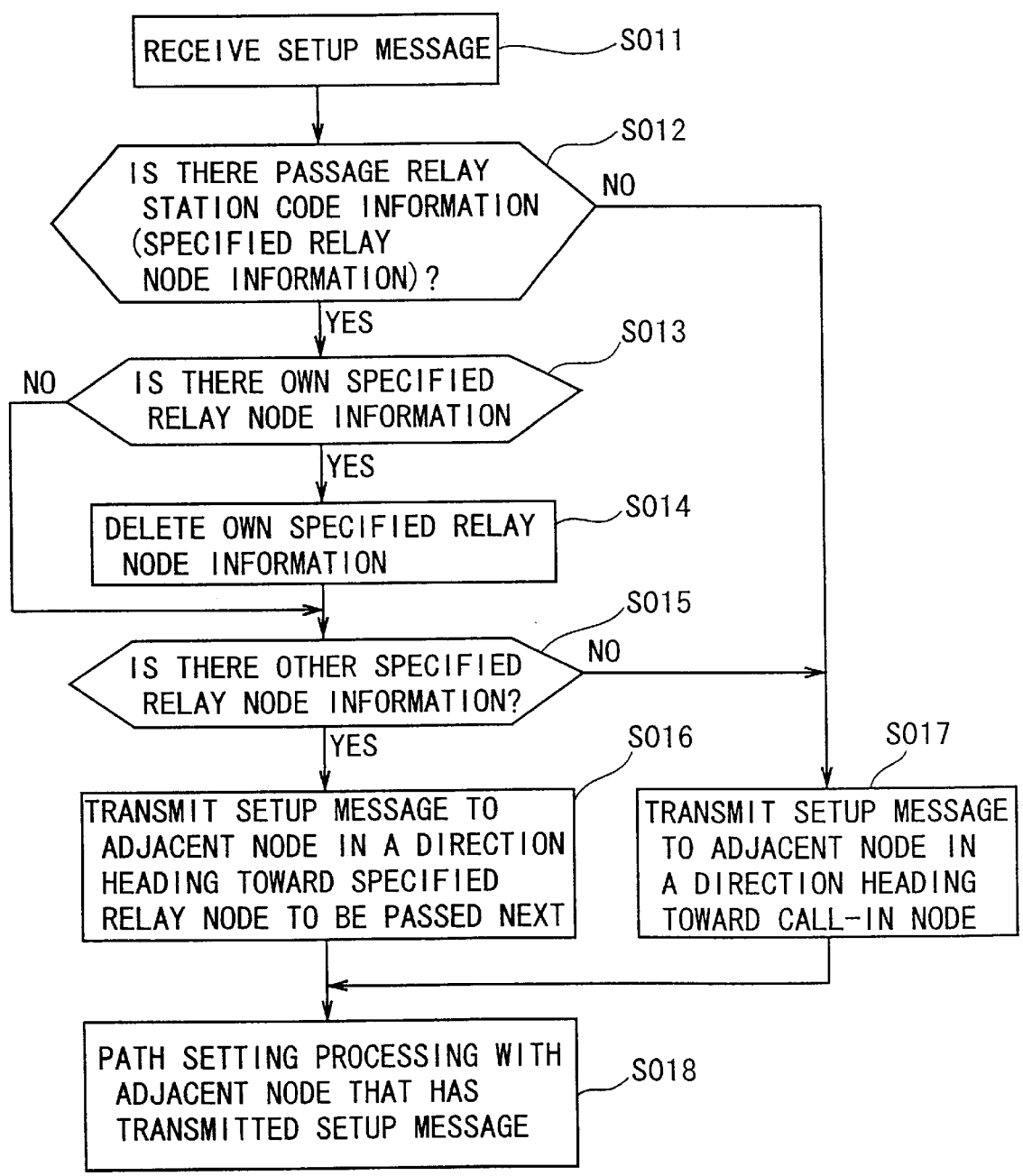
FIG. 8 is a flowchart for explaining the operation of an relay node in the first embodiment.

The control section of the relay node (see FIG. 3) executes the program associated with the path setting signaling by means of the SoftPVC, designating the reception of the SETUP message 20 as a trigger, and executes the processing shown in a flowchart of FIG. 8.

FIG. 8 is a flowchart for explaining the processing of the relay node upon reception of the SETUP message 20 in the first embodiment. An example in which the ATM node B functions as the relay node will be described here.

In FIG. 8, when the relay node receives the SETUP message 20, the control section 10B judges if there is a passage relay station code information (specified relay node information) in the SETUP message 20 or not (step S012). At this time, if there is the specified relay node information, the processing proceeds to the step S013, and if not, the processing proceeds to the step S017.

In the step S013, the control section 10B judges if the specified relay node information (relay station code) of the own station is stored or not in the field 24 of the SETUP message 20. At this time, if there is the corresponding relay station code, the processing proceeds to the step S014, and if not, the processing proceeds to the step S015.

In the step S014, the control section 10B deletes the specified relay node information of the own node from the field 24 of the SETUP message 20. Thereafter, the processing proceeds to the step S015.

In the step S015, the control section 10B judges if there is another specified relay node in the field 24 or not. At this time, if there is another specified relay node, the processing proceeds to the step S016, and if not, the processing proceeds to the step S016 [S017?].

In the step S016, the control section 10B specifies and selects a direction (route) heading toward the specified relay node to be passed next, based on the relay station code in the specified relay node stored in the head of the field 24 and the topological information in the network NW held in advance. The control section 10B transmits the SETUP message 20 to the adjacent node existing on the selected route. Thereafter, the processing proceeds to the step S018.

In the step S017, the control section 10B specifies and selects a direction (route) heading toward the call-in node, based on the call-in point code information stored in the field 23 of the SETUP message 20 and the topological information in the network NW. The control section 10B transmits the SETUP message 20 to the adjacent node existing on the selected route.

In the step S018, a path is set between the concerned relay node and the above-described adjacent node, by the execution of the path setting processing. As described above, the ATM node that has received the SETUP message 20 executes the processing shown in FIG. 8, regardless of whether the own node being specified or not.

Here, the order of the transmission processing (step S016, S017) of the SETUP message 20 and the path setting processing (S018) may be reversed.

(Operation Example in the Network)

An operation example in the network NW will now be described. As an example, an operation when the ATM node A as the call-out node, the ATM node D as the call-in node, and each ATM node B, C as the relay node execute a path setting by means of the SoftPVC will be described.

At first, the NMS 1 provides a SoftPVC connection request message 16 to the ATM node A. The message 16 includes the call-out point code information of the ATM node A as the call-out node, the call-in point code information of the ATM node D as the call-in node, and the passage relay node information (specified relay node information) of each ATM node B, C as the specified relay node.

When the ATM node A receives the message 16 from the NMS 1, the processing shown in FIG. 6 is executed. Then, the SETUP message 20 is delivered to a signaling channel through the ATM-SW12 and an output line corresponding section 13, and transmitted to the ATM node B (step S004). Thereafter, a path is set between the ATM node A and ATM node B (step S006).

When the ATM node B receives the SETUP message 20 from the ATM node A, the processing shown in FIG. 8 is executed. That is to say, the field 24a in the SETUP message 20 is deleted. Thereafter, the SETUP message 20 is transmitted to the ATM node C (step S016). Then, a path is set between the ATM node B and ATM node C (step S018).

When the ATM node C receives the SETUP message 20 from the ATM node B, the processing shown in FIG. 8 is executed. That is to say, the field 24b (field 24) in the SETUP message 20 is deleted. Thereafter, the SETUP message 20 is transmitted to the ATM node D as the call-in node (step S017). Then, a path is set between the ATM node C and ATM node D (step S018).

When the ATM node D receives the SETUP message 20 from the ATM node C, the ATM node D transmits a CONNECT ACK message as a notification of connection completion of the SoftPVC to the ATM node A as the receiver's address. The CONNECT ACK message is received by the ATM node A through each ATM node C, B.

In this manner, the SETUP message 20 comprising the specified relay node information is transmitted from the call-out node to the call-in node via the specified relay node. Thereby, signaling by means of the SoftPVC for setting a path between the call-out node and the call-in node is executed. As a result, a path from the ATM node A to the ATM node D is connected, passing through each ATM node B, C specified by the manager of the network NW.

(Effect of the First Embodiment)

According to the first embodiment, if a manager of the network NW specifies a desired node as the specified relay node, a path from the call-out node to the call-in node passing through the specified relay node is set by signaling by means of the SoftPVC. As a result, the manager can set the path in a desired route by the SoftPVC.

[Second Embodiment]

A network system according to a second embodiment of the present invention will now be described. The second embodiment has common points with the first embodiment. Therefore, the different point will be mainly described, and the description of the common points is omitted.

The NMS 1 in the second embodiment executes the similar processing as in the steps S01 to S04 shown in FIG. 4. However, the NMS 1 prepares a SoftPVC connection request message 16A in which an relay node and the output line number thereof are specified, in the step S01 and the step S02.

Figure 9:
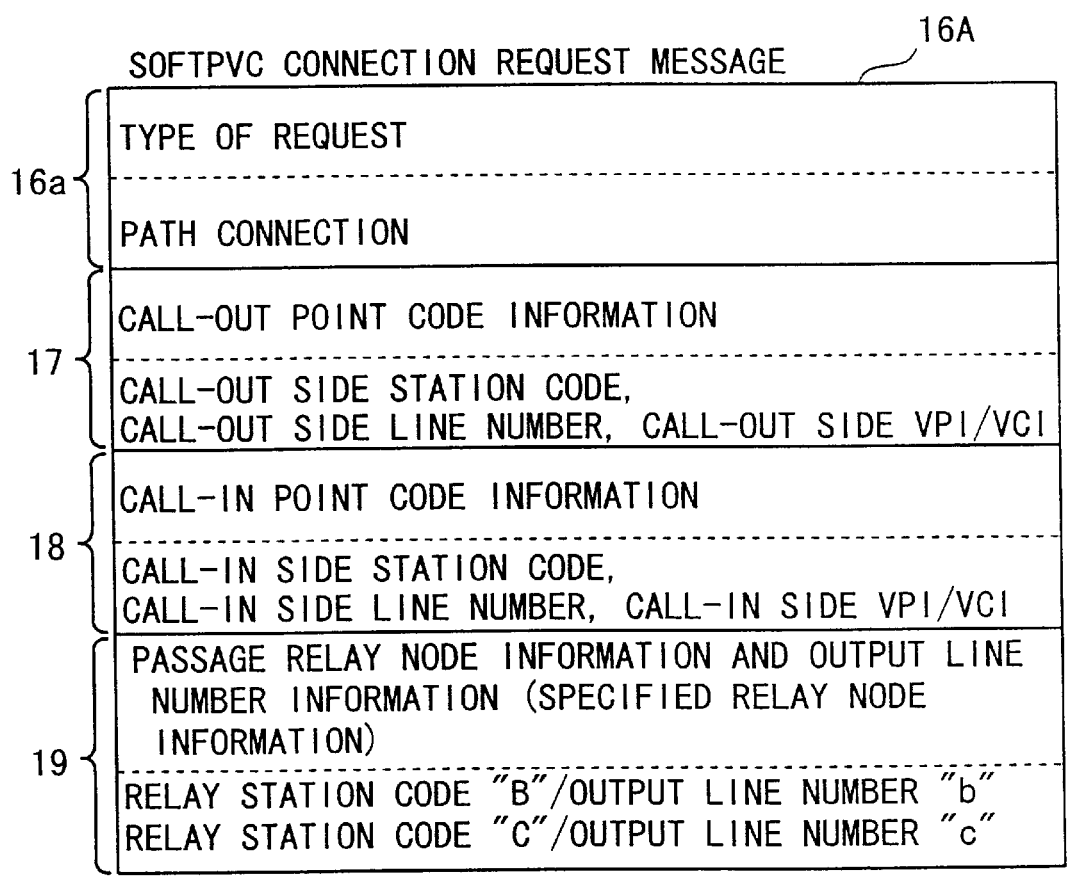
FIG. 9 is a format diagram of a SoftPVC connection request message in the first embodiment.

FIG. 9 is a format diagram of a SoftPVC connection request message 16A in the second embodiment. As shown in FIG. 9, the message 16A is substantially the same as the message 16. However, the passage relay node information and the output line number information (corresponding to the information of the specified output line) are stored in the field 19 as the specified relay node information.

The passage relay node information and the output line number information are a station code of the relay node through which the path is to pass and the output line number thereof. When a plurality of relay nodes are specified, a plurality of passage relay node information and output line number information are stored in the order of passage through the specified relay node.

The call-out node in the second embodiment executes substantially the same processing as in steps S001 to S006 shown in FIG. 6. However, the call-out node prepares a SETUP message 20A reflecting the contents of the message 16A in the step S002.

Figure 10:
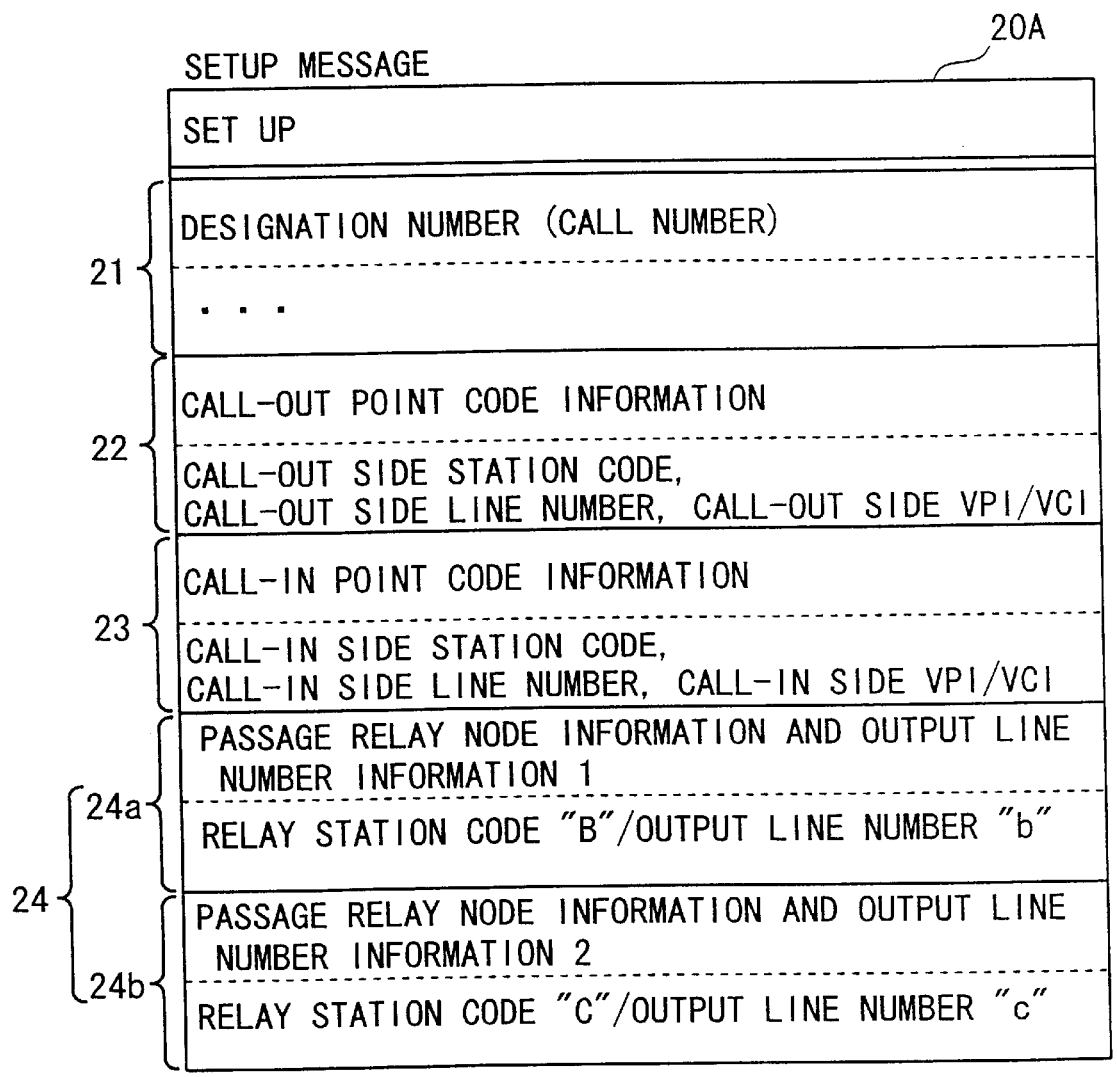
FIG. 10 is a format diagram of a SETUP message in a second embodiment.

FIG. 10 is a format diagram of the SETUP message 20A in a second embodiment. As shown in FIG. 10, the SETUP message 20A comprises a field 24. The field 24 is divided into areas depending on the number of each specified relay nodes (in the example shown in FIG. 10, into each area 24a, 24b). In each area 24a, 24b, there are stored the relay station code and the output line number in the order of passage of the path.

Figure 11:
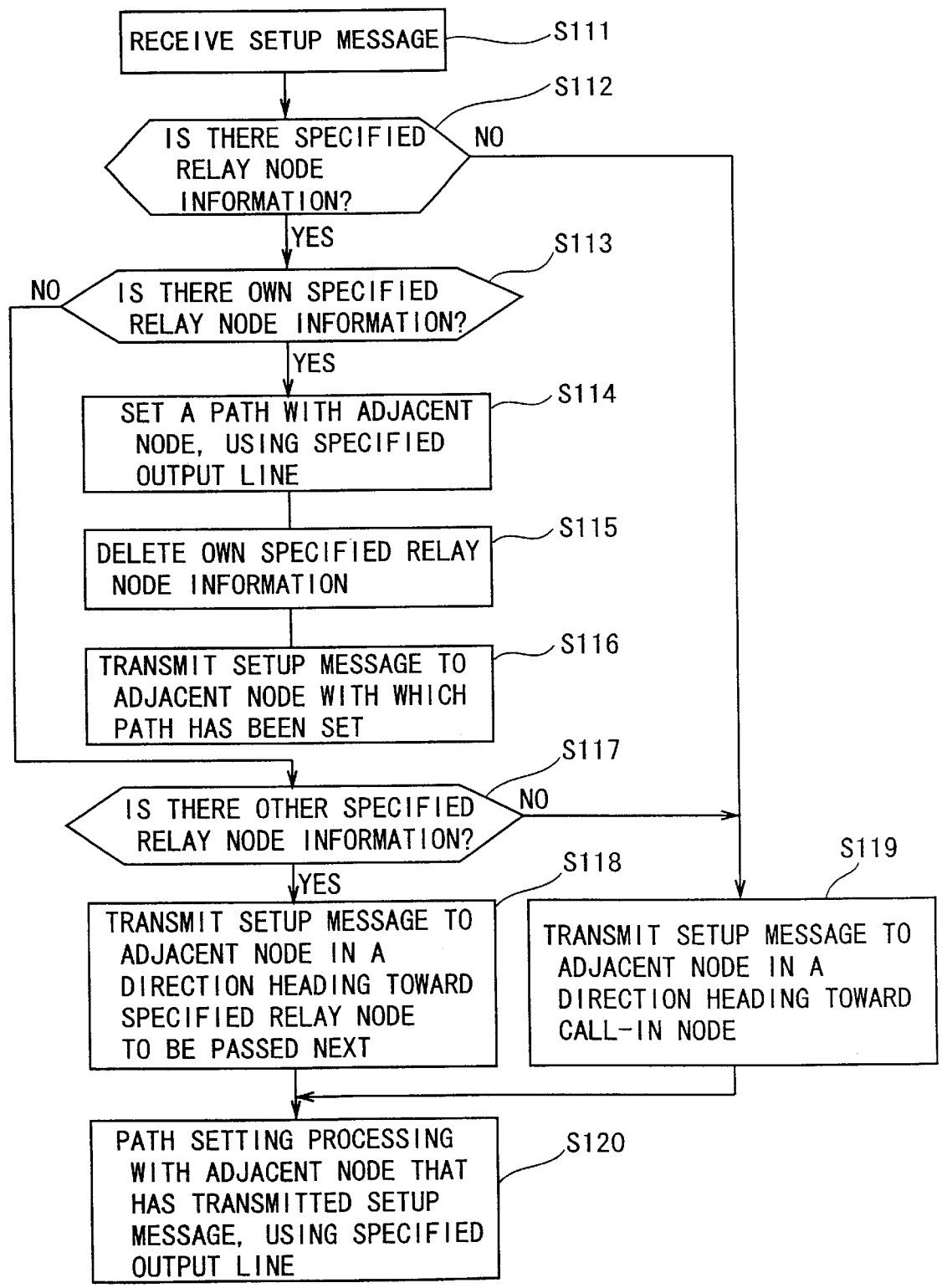
FIG. 11 is a flowchart for explaining the operation of an relay node in the second embodiment.

The relay node in the second embodiment executes the operation in accordance with the flowchart shown in FIG. 11, upon reception of the SETUP message 20A. FIG. 11 is a flowchart showing the operation (processing) of an relay node in the second embodiment.

In FIG. 11, steps S111 to S113 are the same as steps S011 to S013 (see FIG. 8) in the first embodiment. In the step S113, if there is the specified relay node information of the own node, the processing proceeds to the step S114, and if not, the processing proceeds to the step S117.

In the step S114, the relay node sets a path between the own node and an adjacent node connected through an output line corresponding to the specified output line number. Thereafter, the processing proceeds to the step S115.

In the step S115, the relay node deletes the own specified relay node information from the SETUP message 20A. Thereafter, the processing proceeds to the step S116. In the step S116, the relay node transmits the SETUP message 20A to the adjacent node with which the path has been set.

The processing in the steps S117 to S120 are the same as the processing in the steps S015 to S018 in the first embodiment, and hence the description thereof is omitted. The order of the transmission processing (step S118, S119) of the SETUP message 20A and the path setting processing (S120) may be reversed.

(Effects of the Second Embodiment)

According to the second embodiment, the manager of the network NW specifies the node through which the path is to pass and the output line number of the path, and inputs the SoftPVC path setting instruction into the NMS 1. Then, the NMS 1 transmits to the call-out node the message 16A comprising the specified node and the output line number as the specified relay node information. As a result, in the network NW, a path from the call-out node to the call-in node passing through the specified node and output line can be set.

[Third Embodiment]

A network system according to a third embodiment of the present invention will now be described. The third embodiment has common points with the first embodiment. Therefore, the different point will be mainly described, and the description of the common points is omitted.

The NMS 1 in the third embodiment executes the similar processing as in the steps S01 to S04 shown in FIG. 4. However, the NMS 1 prepares a SoftPVC connection request message 16B in which an relay node through which the path does not pass intentionally is specified, in the step S01 and the step S02.

Figure 12:
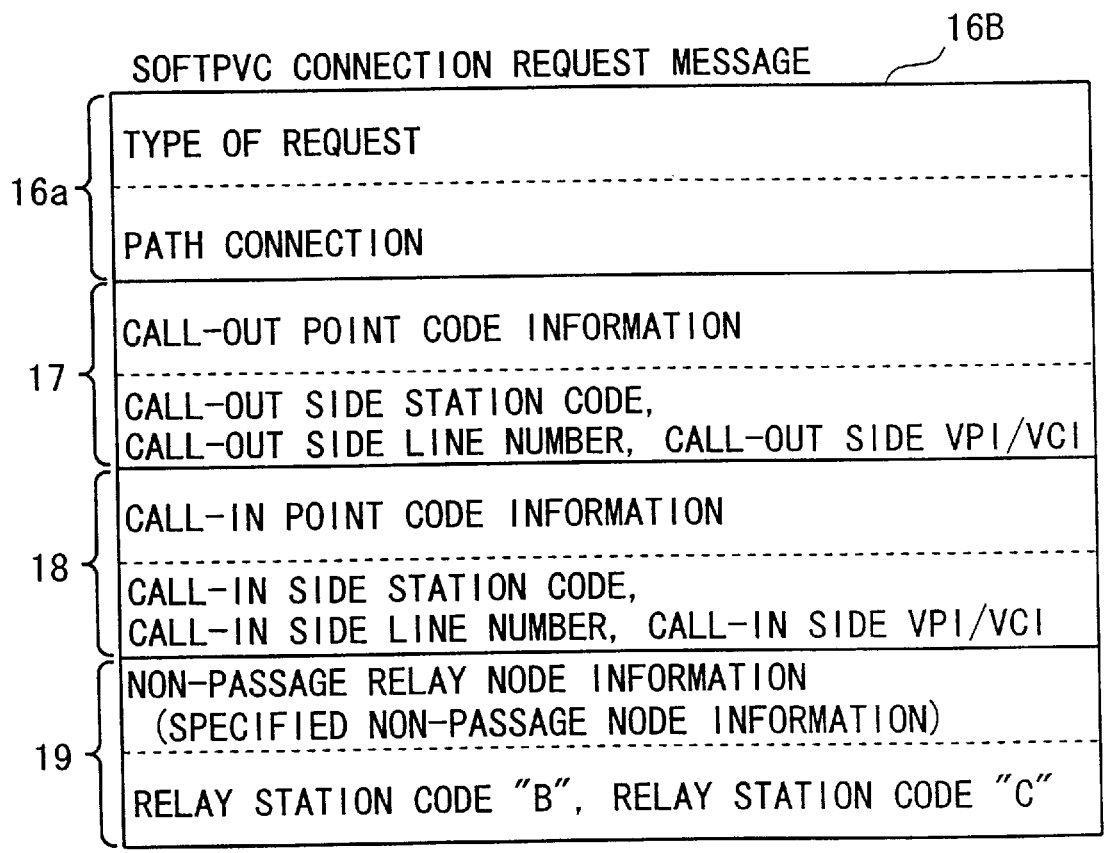
FIG. 12 is a format diagram of a SoftPVC connection request message in a third embodiment.

FIG. 12 is a format diagram of a message 16B. As shown in FIG. 12, the message 16B is substantially the same as the message 16. However, the non-passage relay node information (specified non-passage node information: corresponding to the information of the specified non-passage node) is stored in the field 19.

The non-passage relay node information is a station code of an relay node through which the path does not pass. When a plurality of non-passage relay nodes are specified, a plurality of non-passage relay node information are stored in an optional order.

Figure 13:
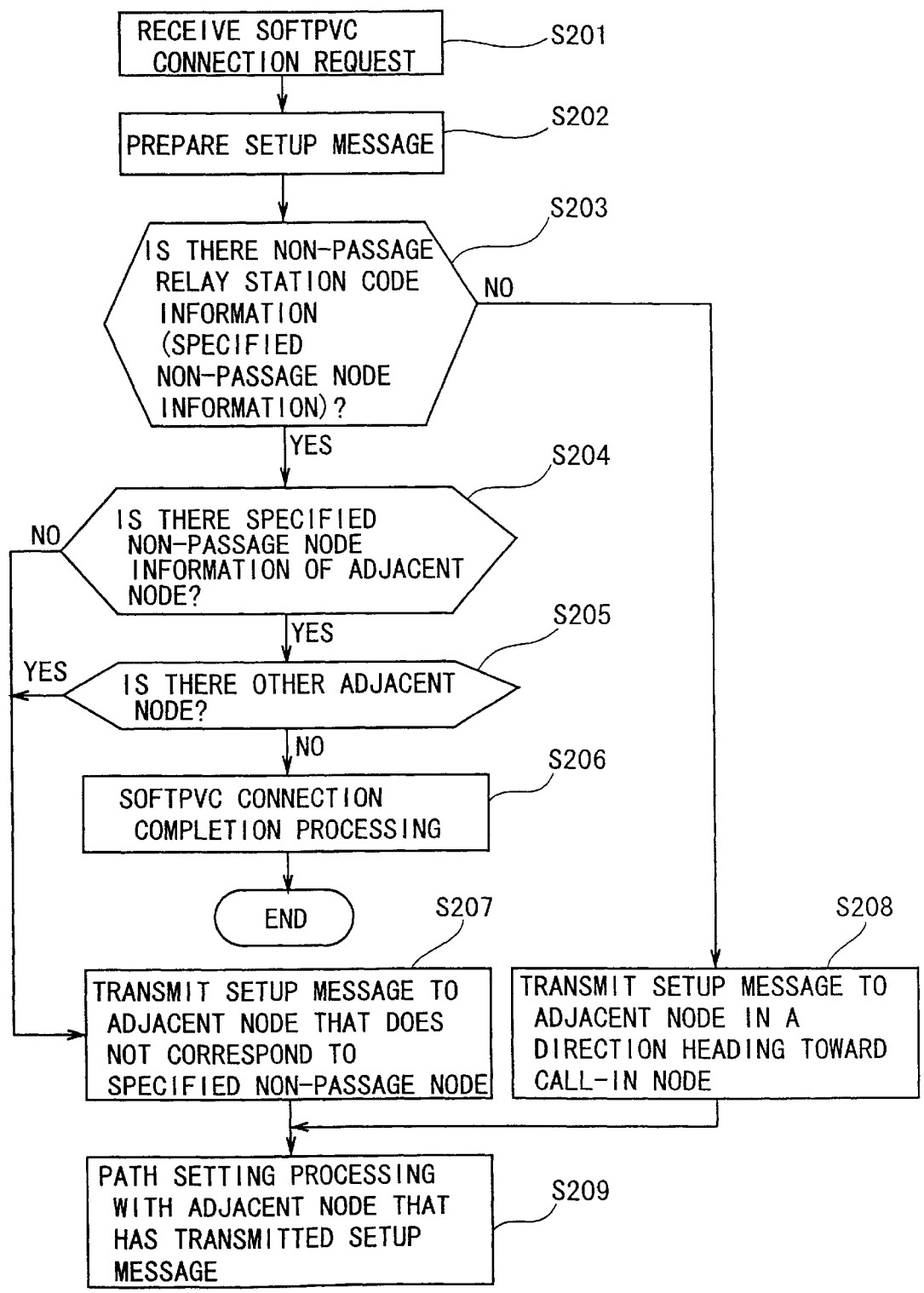
FIG. 13 is a flowchart for explaining the operation of a call-out node in the third embodiment.

The call-out node in the second embodiment executes the processing shown in FIG. 13, designating the reception of the message 16B from the NMS 1 as a trigger. FIG. 13 is a flowchart showing the operation of a call-out node in the third embodiment When the call-out node is, for example, ATM node A, the control section 10A of the ATM node A prepares a SETUP message 20B reflecting the contents of the message 16B (step S202), upon reception of the message 16B (step S201).

Figure 14:
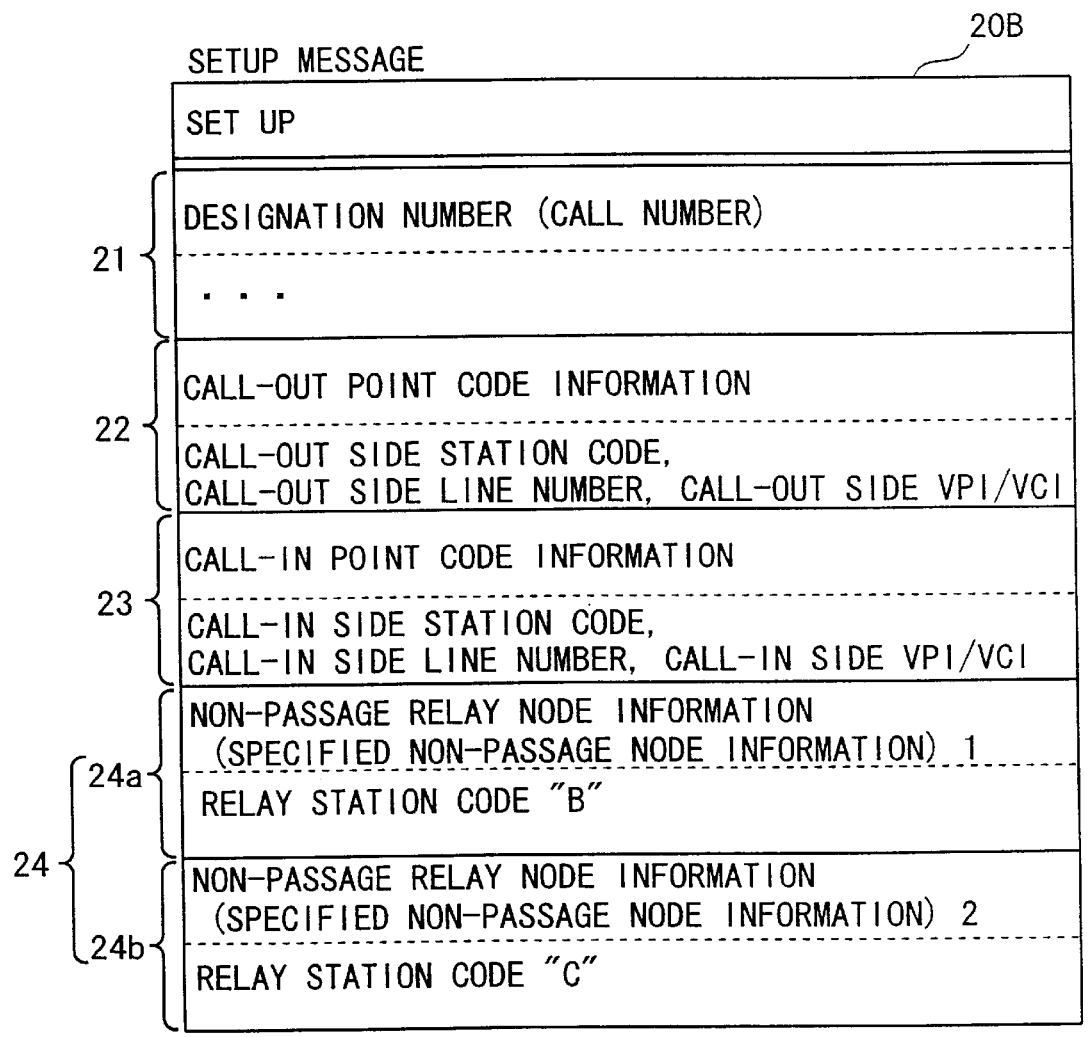
FIG. 14 is a format diagram of a SETUP message in the third embodiment.

FIG. 14 is a format diagram of the SETUP message 20B. The SETUP message 20B comprises a field 24. The field 24 is divided into areas depending on the number of specified non-passage nodes. In an example of FIG. 14, the field 24 is divided into area 24a and area 24b. In each area 24a, 24b, the station codes of the specified non-passage nodes are stored in the order of, for example, proximity to the call-out node.

Returning to FIG. 13, in the step S203, the control section 10A judges whether a specified non-passage node is included or not in the field 24 of the SETUP message 20B. At this time, if the specified non-passage node is included, the processing proceeds to the step S204, and if not, the processing proceeds to the step S208.

In the step S204, the control section 10A refers to the topological information held in advance, and judges whether or not specified non-passage node information (station code) is included in the field 24, based on the topological information. At this time, if the corresponding specified non-passage node information is included, the processing proceeds to the step S205, and if not, the processing proceeds to the step S207.

In the step S205, the control section 10A judges whether there is an adjacent node other than the adjacent node corresponding to the specified non-passage node or not. At this time, if there is no corresponding adjacent node, the processing proceeds to the step S206, and if there is, the processing proceeds to the step S207.

In the step S206, SoftPVC connection completion processing is executed. That is to say, the message 16B is rejected. Moreover, according to need, it is notified to the NMS 1 that the SoftPVC requested to connect cannot be connected. Then, the path setting processing by means of the SoftPVC is completed.

In the step S207, the control section 10A specifies and selects a direction (route) heading toward the adjacent node that does not correspond to the specified non-passage node, based on the topological information. The control section 10A transmits the SETUP message 20B to the adjacent node existing on the selected route. Thereafter, the processing proceeds to the step S209.

In the step S208, the control section 10A transmits the SETUP message to the adjacent node existing on the route heading toward the call-in node, judging that a specified non-passage node is not specified in the SoftPVC connection request.

In the step S209, a path is set between the call-out node and the adjacent node that is to receive the SETUP message, by executing signaling. In addition, the order of the transmission processing (step S207, S208) of the SETUP message 20B and the path setting processing (S209) may be reversed.

Figure 15:
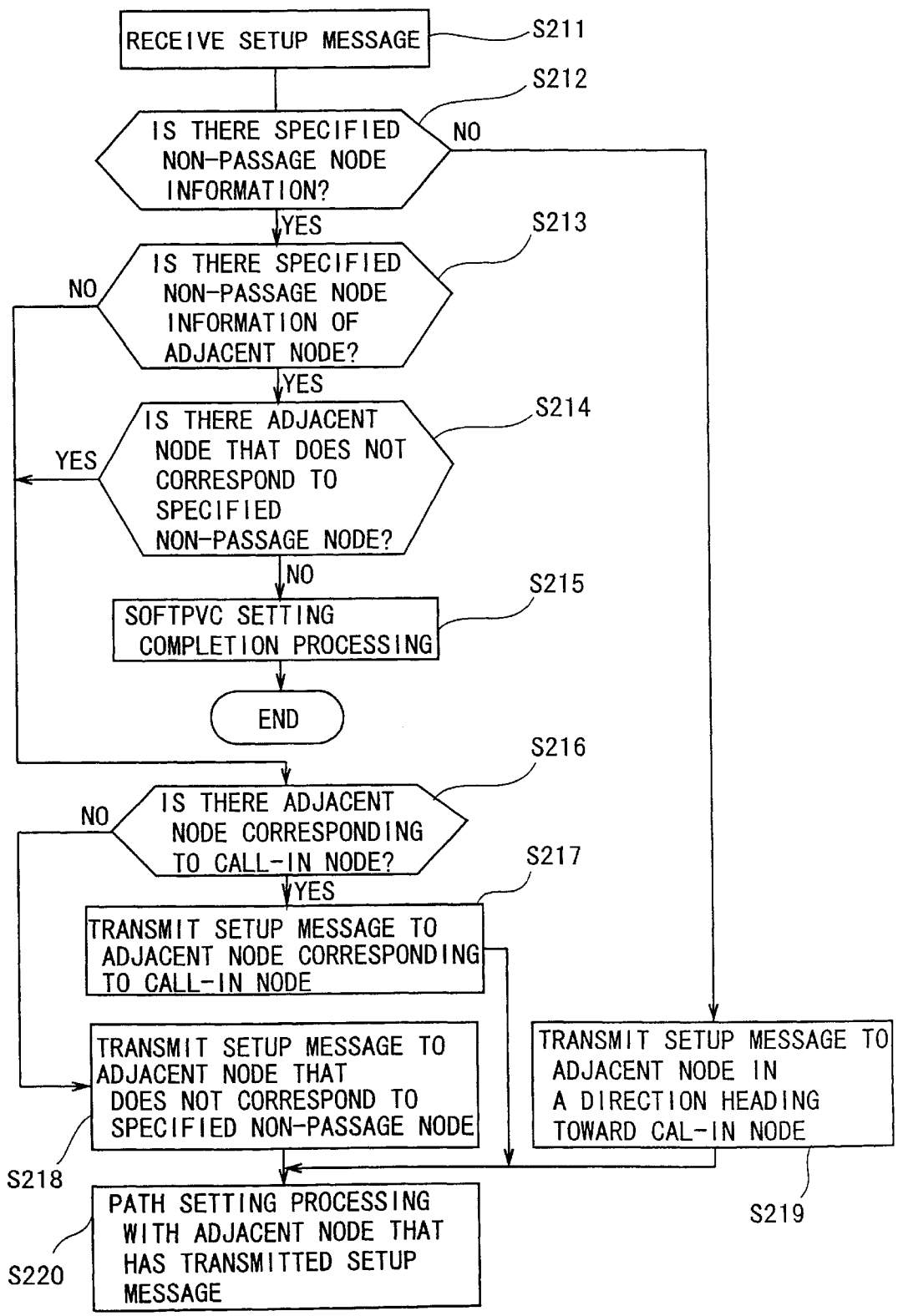
FIG. 15 is a flowchart for explaining the operation of an relay node in the third embodiment.

The relay node in the third embodiment executes the processing shown in the flowchart of FIG. 15, upon reception of the SETUP message 20B. FIG. 15 is a flowchart showing the operation (processing) of the relay node in the third embodiment.

An example in which the relay node is the ATM node B will now be described. In FIG. 15, when the ATM node B receives the SETUP message 20B (step S211), the control section 10B judges if specified non-passage node information is stored or not in the field 24 of the SETUP message 20B. At this time, if the specified non-passage node information is stored, the processing proceeds to the step S213, and if not, the processing proceeds to the step S219.

In the step S213, the control section 10B judges whether or not there is specified non-passage node information of the adjacent node in the field 24, using the topological information held in advance. At this time, if there is the corresponding specified non-passage node information, the processing proceeds to the step S214, and if not, the processing proceeds to the step S216.

In the step S214, the control section 10B judges whether or not there is an adjacent node that does not correspond to the specified non-passage node in the adjacent nodes of the ATM node B (adjacent nodes which have received the SETUP message 20B (in this example, excluding the ATM node A)). At this time, if there is the corresponding adjacent node, the processing proceeds to the step S216, and if not, the processing proceeds to the step S215.

In the step S215, the SoftPVC connection completion processing is executed. That is to say, the SETUP message 20B is rejected. Moreover, according to need, it is notified to the call-out node that the SoftPVC requested to connect cannot be connected. Then, the path setting processing by means of the SoftPVC is completed.

In the step S216, the control section 10B judges whether or not there is an adjacent node corresponding to the call-in node, based on the topological information. At this time, if there is the corresponding adjacent node, the processing proceeds to the step S217, and if not, the processing proceeds to the step S218.

In the step S217, the control section 10B transmits the SETUP message 20B to the adjacent node corresponding to the call-in node. Thereafter, the processing proceeds to the step S220.

In the step S218, the control section 10B specifies and selects a route heading toward the adjacent node that does not correspond to the specified non-passage node, based on the topological information. The control section 10B transmits the SETUP message 20B to the adjacent node existing on the selected route. Thereafter, the processing proceeds to the step S220.

In the step S219, the SETUP message is transmitted to the adjacent node existing on the route heading toward the call-in node. In the step S220, a path is set between the concerned relay node and the adjacent node that is to receive the SETUP message, by signaling.

By the above-described processing, the SETUP message 20B is received by the call-in node, and the CONNECT ACK message is transmitted from the call-in node to the call-out node. As a result, a path from the call-out node to the call-in node is connected and established.

Here, the order of the transmission processing (step S218, S219) of the SETUP message 20B and the path setting processing (S220) may be reversed.

(Effects of the Third Embodiment)

According to the third embodiment, a path from the call-out node to the call-in node that does not pass through a specified node can be set by means of the SoftPVC.

[Fourth Embodiment]

A network system according to a fourth embodiment of the present invention will now be described. The fourth embodiment has common points with the second and third embodiments. Therefore, the different point will be mainly described, and the description of the common points is omitted.

The NMS 1 in the fourth embodiment executes the similar processing as in the steps S01 to S04 shown in FIG. 4. However, a SoftPVC connection request message 16C in which a specified non-passage node and the output line number thereof are specified is prepared in the step S01 and the step S02.

FIG. 16 is a format diagram of the message 16C. The message 16C is substantially the same as the message 16A (see FIG. 9). However, the non-passage relay node information and the output line number information (corresponding to the information associated with the specified non-passage channel) are stored in the field 19.

The non-passage relay node information and the output line number information are a station code of ATM node through which the path does not pass and the output line number thereof. When a plurality of ATM nodes are specified as the non-passage relay node, a plurality of non-passage relay node information and the output line number information are stored in an optional order.

Figure 17:
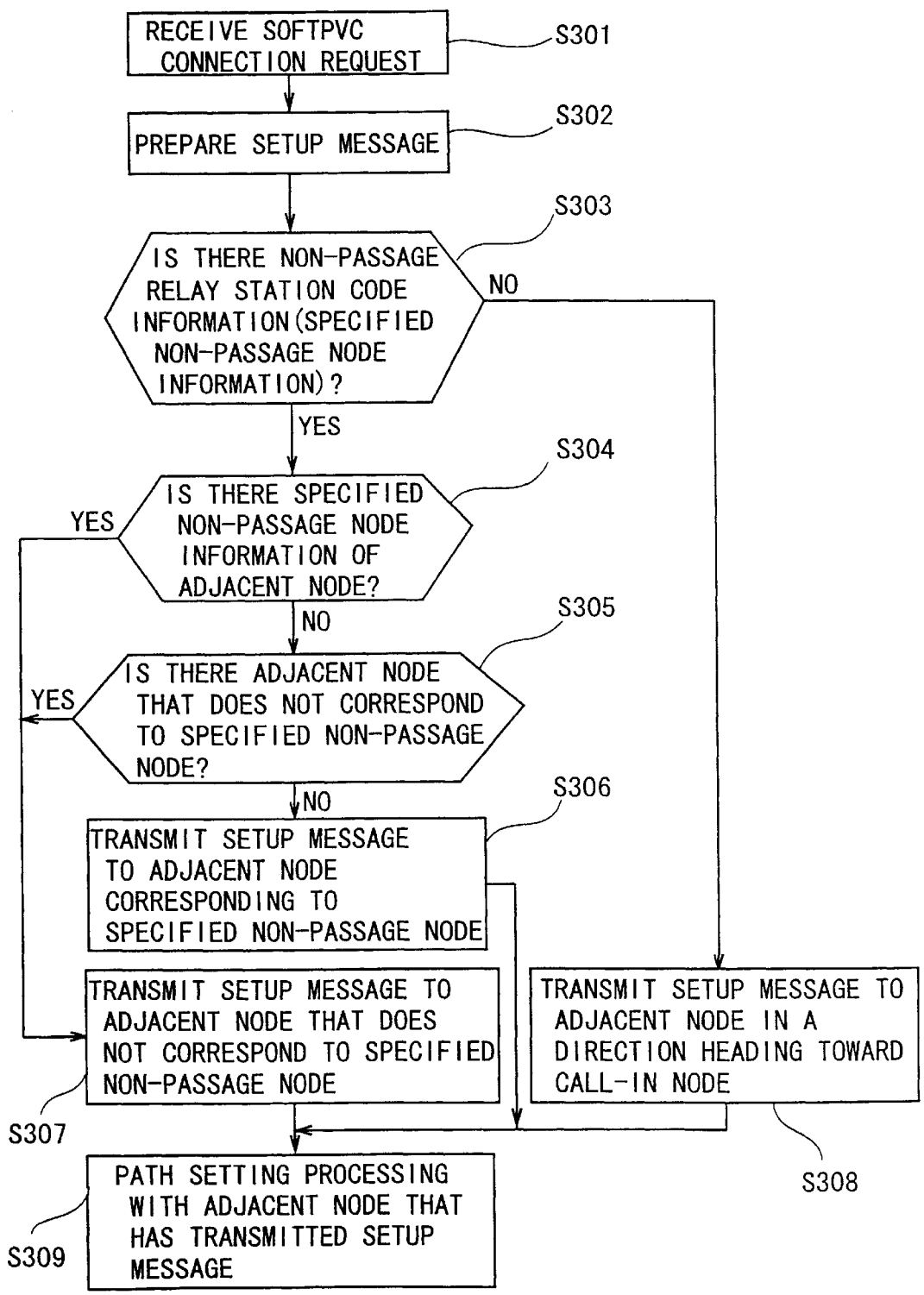
FIG. 17 is a flowchart for explaining the operation of a call-out node in the fourth embodiment.

The call-out node in the fourth embodiment executes the processing shown in the flowchart of FIG. 17, upon reception of the message 16C from the NMS 1. FIG. 17 is a flowchart showing the operation (procedure) of the call-out node in the fourth embodiment.

The processing of the call-out node shown in FIG. 17 is substantially the same as the processing shown in FIG. 13. However, in the step S302 corresponding to the step S202, a SETUP message 20C reflecting the contents of the message 16C is prepared.

Figure 18:
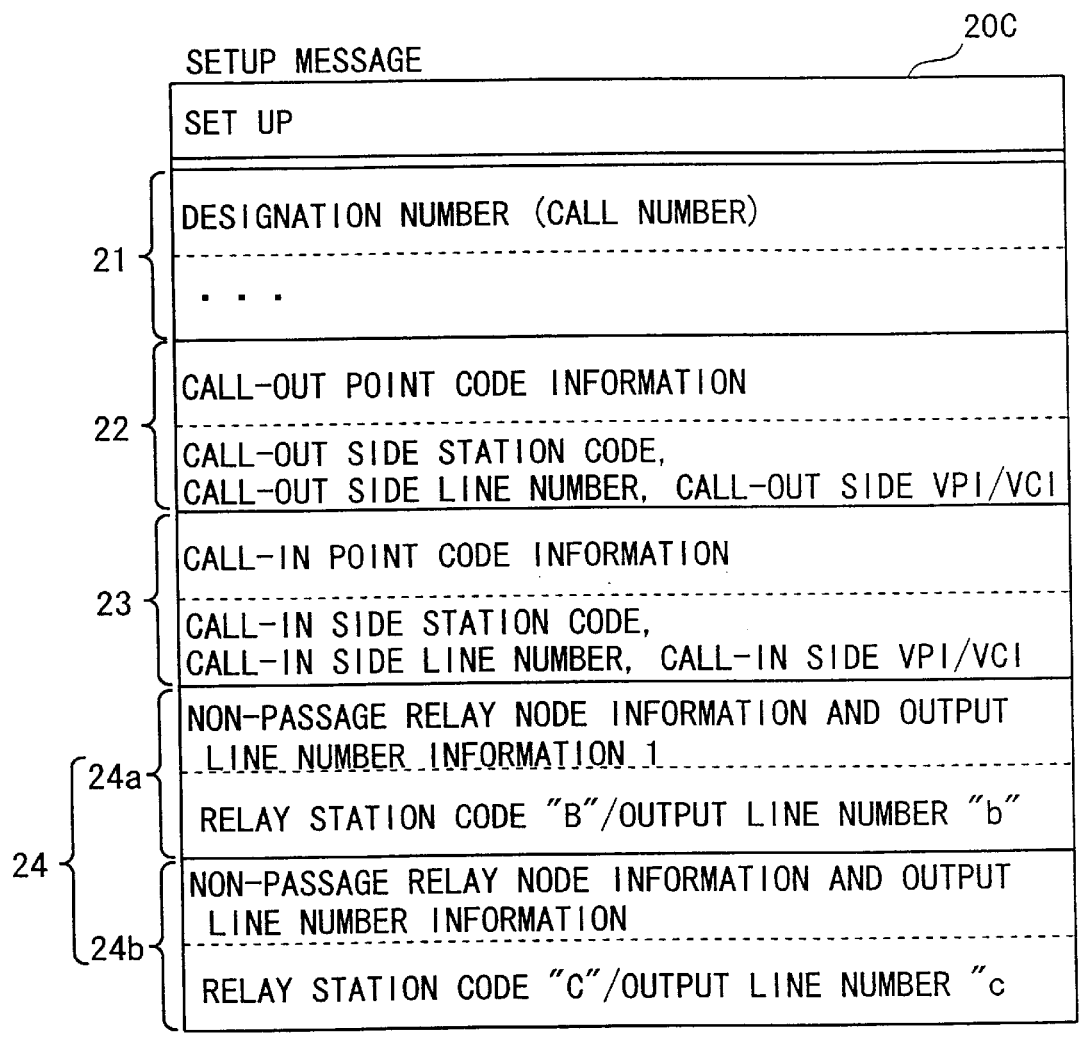
FIG. 18 is a format diagram of a SETUP message in the fourth embodiment.

FIG. 18 is a format diagram of a SETUP message 20C. The SETUP message 20C comprises a field 24. The field 24 is divided into areas depending on the number of specified non-passage nodes. In an example of FIG. 18, the field 24 is divided into area 24a and area 24b. In each area 24a, 24b, the specified non-passage relay station code and the output line number are stored in the order of, for example, proximity to the call-out node.

In the step S305 corresponding to the step S205, if there is no adjacent node that does not correspond to the specified non-passage node (step S305: N), the SETUP message 20C is transmitted to the adjacent node corresponding to the specified non-passage node (step S306). At this time, if there are a plurality of adjacent nodes corresponding to the specified non-passage node, the SETUP message 20C is transmitted to one adjacent node according to a predetermined priority (for example, in the order of storage into the field 24). Thereafter, a path setting processing is executed in the step S309 corresponding to the step S209.

Figure 19:
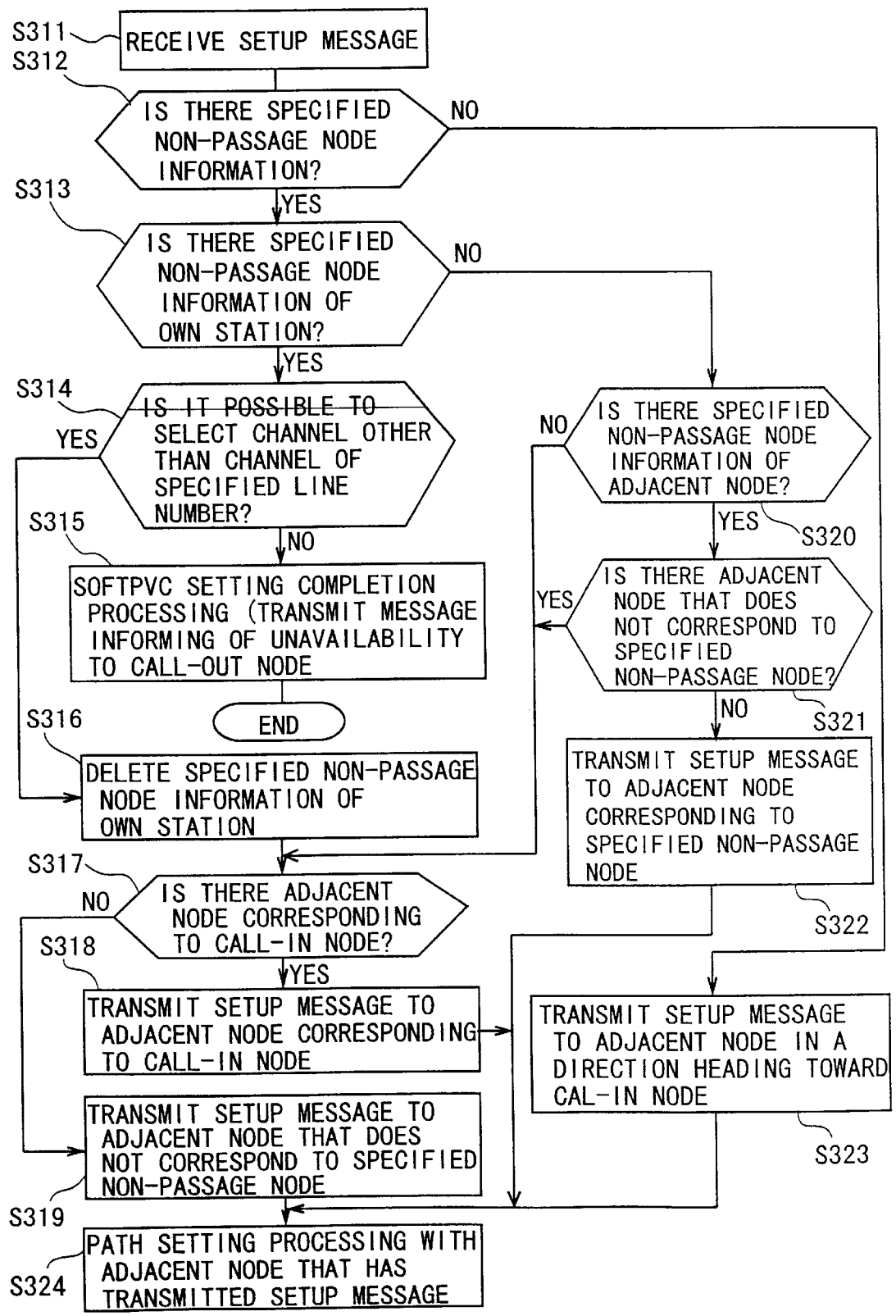
FIG. 19 is a flowchart for explaining the operation of an relay node in the fourth embodiment.

The relay node (the control section thereof) in the fourth embodiment executes the operation according to the flowchart in FIG. 19, upon reception of the SETUP message 20C. FIG. 19 is a flowchart showing the operation (processing) of the relay node in the fourth embodiment.

In FIG. 19, the processing in each step S311, S312, S323 are the same as that in each step S211, S212 and S219 shown in FIG. 15. However, if there is the specified non-passage node information of the own station in the step S313, the processing proceeds to the step S314, and if not, the processing proceeds to the step S320.

In the step S314, the control section judges whether it is possible or not to select an output line other than the output line corresponding to the output line number specified in the specified non-passage node information of the own station (corresponding to the specified non-passage channel). At this time if the other output line can be selected, the processing proceeds to the step S316, and if not, the processing proceeds to the step S315.

In the step S315, the SoftPVC setting completion processing is executed, and an unavailability message informing that an output line other than the specified output line cannot be used is transmitted to the call-out node. Thereafter, the processing associated with the SoftPVC connection is completed.

In the step S316, the specified non-passage node information of the own station is deleted from the field 24. Thereafter, the processing proceeds to the step S317.

In the step S317, it is judged whether or not there is an adjacent node corresponding to the call-in node, based on the call-in point code information and the topological information. At this time, if there is a corresponding adjacent node, the processing proceeds to the step S318, and if not, the processing proceeds to the step S319.

In the step S318, the SETUP message 20C is transmitted to the adjacent node corresponding to the call-in node. Thereafter, the processing proceeds to the step S324. In the step S319, the SETUP message 20C is transmitted to the adjacent node that does not correspond to the specified non-passage node. Thereafter, the processing proceeds to the step S324. In the step S324, a path is set between the concerned relay node and the adjacent node that is to receive the SETUP message 20C.

The processing in steps S320 to S322 is the same as that in steps S304 to S306 shown in FIG. 17, and hence the description thereof is omitted. As described above, in the relay node, a route selection and path setting are executed such that the specified output line is not used.

(Effects of the Fourth Embodiment)

According to the fourth embodiment, a path from the call-out node to the call-in node that does not pass through the output line of the specified node can be set by the SoftPVC.

[Fifth Embodiment]

A network system according to a fifth embodiment of the present invention will now be described. In the respective first to fourth embodiment, when the call-in node receives the SETUP message from the call-out node, the call-in node connects the path (SoftPVC) by means of a message exchange according to signaling of the SoftPVC. Thereafter, the call-in node transmits the CONNECT ACK message that is a message informing of the path connection completion.

The CONNECT ACK message transmitted from the call-in node turns back the route in which the SETUP message has been transmitted (via each relay node that the SETUP message has passed through), and is finally received by the call-out node. In the fifth embodiment, the route information connected to the SoftPVC is collected, using the CONNECT ACK message.

That is to say, each control section in each ATM node A to E in the fifth embodiment performs the similar processing as in the first to fourth embodiments. Each control section stores the own station code and the output line number associated with the set path in a storage medium (not shown) when the own node executes the path setting processing between the own node as the relay node and the adjacent node (steps S018, S118, S220, S322).

Thereafter, the control section stores the own station code and the output line number held in the storage medium in the CONNECT ACK message 30 and transmits this message 30 to the adjacent node which is to receive the message, when the own node receives the CONNECT ACK message 30 transmitted from the call-in node.

Figure 20:
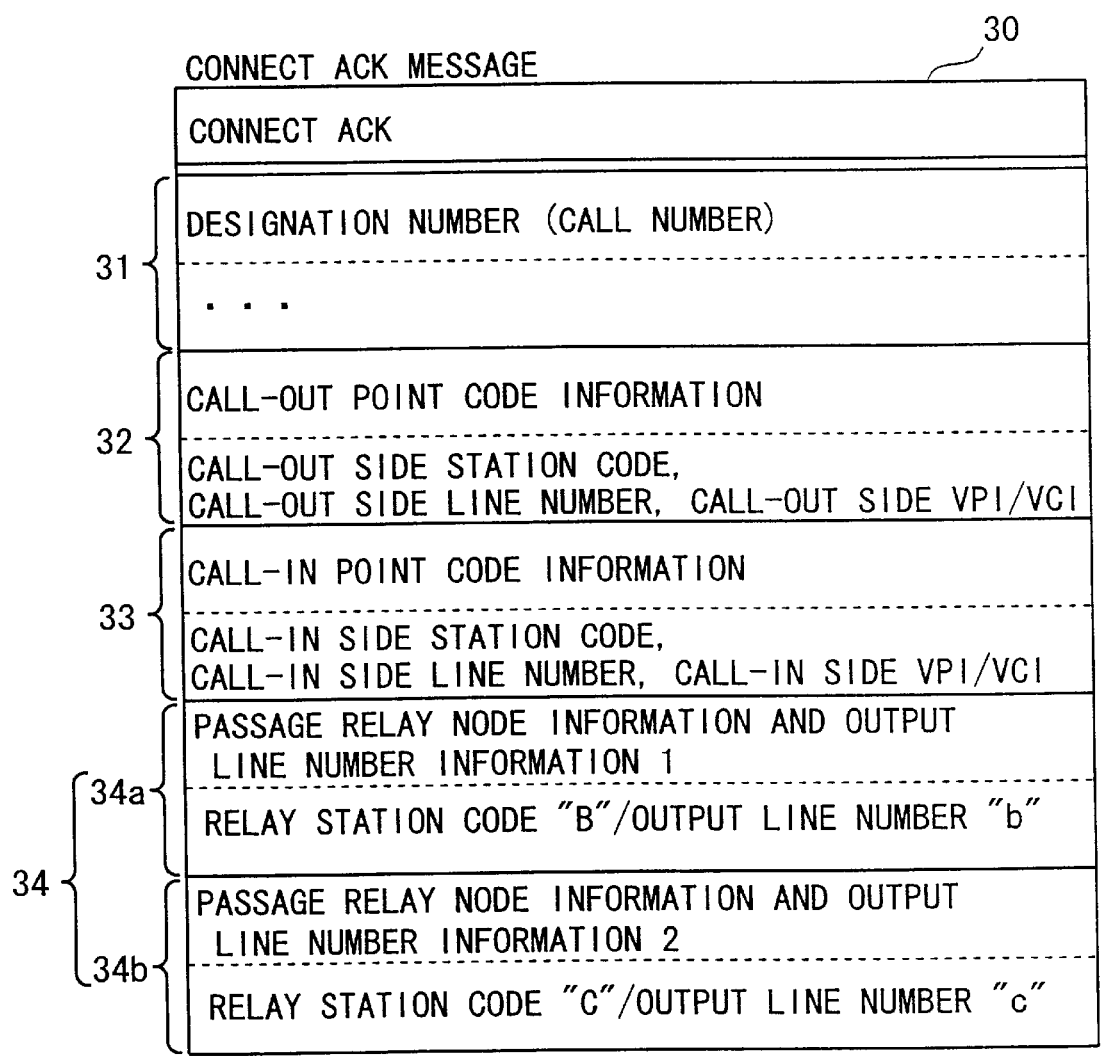
FIG. 20 is a format diagram of a CONNECT ACK message in a fifth embodiment.

FIG. 20 is a format diagram of the CONNECT ACK message 30 in the fifth embodiment. The CONNECT ACK message 30 has fields 31 to 34. The field 31 retains the designation number. The field 32 retains the call-out point code information. The field 33 retains the call-in point code information. These designation number, call-out point code information and call-in point code information are stored by the call-in node.

The field 34 retains the passage relay node information and the line number information (corresponding to the information associated with the path) as the node connection information. When receiving the CONNECT ACK message 30, each relay node stores in the field 34 the own station code and the output line number stored in the above-described storage medium.

At this time, when a station code and output line number of another relay node are already stored in the field 34, the relay node stores the own station code and the output line number in the free area in the field 34.

As a result, as shown in FIG. 20, the field 34 in the CONNECT ACK message 30 that has passed through a plurality of relay nodes is divided into a plurality of areas (in the example of FIG. 20, area 34a and area 34b), with the station code and the output line number of one relay node being stored in each area.

Thereafter, when the call-out node receives the CONNECT ACK message 30, in the field 34 in the received CONNECT ACK message 30, there are stored the station code and the output line number of each relay node between the call-out node and the call-in node.

Thereafter, the call-out node transmits the contents stored in the field 34 to the NMS 1. The NMS 1 receives the contents stored in the field 34 and stores the contents in the path information DB 41 (see FIG. 22) in the HDD 7.

(Effects of the Fifth Embodiment)

According to the fifth embodiment, the connection information of each node is collected as the route information of the SoftPVC, utilizing the CONNECT ACK message 30, and the collected connection information is provided from the call-out node to the NMS 1. The NMS 1 retains the obtained connection information in the path information DB 41 (see FIG. 22).

The information retained in the path information DB 41 is utilized by the manager of the network NW as the control information or management information of the network NW associated with the maintenance of the node, line, or the like.

In the fifth embodiment, the NMS 1 has the topological information of the network NW, and the input line number of each ATM node A to E is included in the topological information. Therefore, the station code and the output line number of each ATM node existing on the route in the SoftPVC are collected and retained. Alternatively, each relay node may store the station code, output line number and input line number in the CONNECT ACK message 30, and the NMS 1 may collect and retain the input line number.

Moreover, instead of the construction in the fifth embodiment, after having performed the path setting processing with the adjacent node, each relay node may transmit the own station code and output line number thereof to the NMS 1, associated with the specific information in the SoftPVC connection request, and the NMS 1 may retain the station code and output line number received from each relay node as the connection information.

Furthermore, instead of the construction in the fifth embodiment, each relay node may store the own station code and output line number thereof in the CONNECT ACK message to be transmitted to the call-out node, after having performed the path setting processing with the adjacent node, and the call-out node may transmit the station code and output line number thereof stored in the CONNECT ACK message received from each relay node to the NMS 1.

[Sixth Embodiment]

A network system according to a sixth embodiment of the present invention will now be described. The sixth embodiment is different from the fifth embodiment, wherein the NMS 1 accesses each relay node to thereby collect and retain the route information of the SoftPVC (connection information).

The control section in each ATM node A to E in the sixth embodiment performs the similar processing as described in the first to fourth embodiments, when the own station becomes the relay node (when it receives the SETUP message). At this time, the control section retains the connection information associated with the concerned path in a table 40 prepared in a storage medium (not shown) in the control section.

FIG. 21 is a diagram of the table 40 held by each ATM node in the sixth embodiment. As shown in FIG. 21, the table 40 retains for each path the record of the connection information to which a connection number is allocated.

The record comprises the connection route information (input line number/output line number), the station code of the call-out node, the call-out side line identification number and VPI/VCI, the station code of the call-in node, and the call-in side line identification number and VPI/VCI.

When receiving the SETUP message, the control section of the relay node reads out the station code of the call-out node, the line identification number and VPI/VCI of the call-out node, the station code of the call-in node, and the line identification number and VPI/VCI of the call-in node from the SETUP message, and stores these information in the table 40.

Then, the control section of the relay node transmits the SETUP message to the adjacent node, and when a path is set with the adjacent node, the control section stores the connection route information (input line number and output line number) to the table 40.

Thereafter, the NMS 1 transmits an inquiry request message for the connection information comprising a predetermined search key (for example, call-out point code information, and call-in point code information, or entire search) to each ATM node A to E, according to need.

Upon reception of the inquiry request message, each ATM node A to E retrieves from the table 40, using the search key included in the received inquiry request message, finds the corresponding record or necessary information in the corresponding record, prepares a response message including the found record or information and transmits the message to the NMS 1.

Moreover, when the search key included in the inquiry request message specifies entire search, each ATM node A to E transmits the response message including the whole records stored in the table 40 to the NMS 1.

Accordingly, when the NMS 1 desires to obtain connection information regarding a certain path, an inquiry message for obtaining the desired connection information is transmitted to each ATM node A to E. As a result, the NMS 1 can obtain the response message including the desired connection information from each ATM node A to E (see FIG. 23). That is to say, the NMS 1 can collect the desired connection information from each ATM node A to E, and retain the information in the path information DB 41 (see FIG. 22), according to need.

(Effects of the Sixth Embodiment)

According to the sixth embodiment, the NMS 1 collects the connection information, according to need, from each ATM node A to E, and stores the information in the path information DB 41. As a result, for example, at the time of maintenance of the ATM node and transmission line (channel), the connection of the SoftPVC that requires changeover can be specified, and the call-out node in the SoftPVC can be also specified.

[Seventh Embodiment]

A network system according to a seventh embodiment of the present invention will now be described. According to the construction of the fifth or sixth embodiment, the NMS 1 can obtain the connection information of all paths in all ATM nodes (ATM nodes A to E) controlled by the NMS 1. The NMS 1 in the seventh embodiment retains and manages the connection information of all paths in the all ATM nodes in the path information DB 41 prepared in the HDD 7.

FIG. 22 is a diagram of the path information DB 41 held by the NMS 1. The path information DB 41 stores, for each path, records comprising the station code of the call-out node, the line number and VPI/VCI of the call-out node, the station code of the call-in node, line number and VPI/VCI of the call-in node, and the connection route information.

Figure 23:
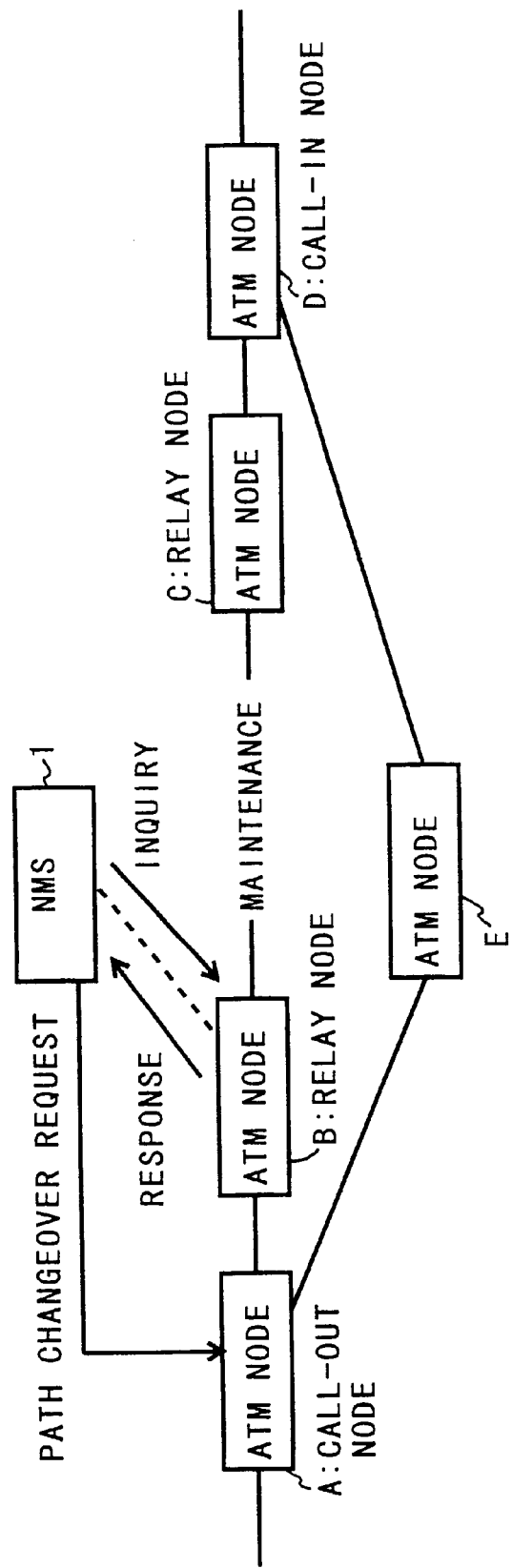
FIG. 23 is an operational diagram of a path changeover processing in the seventh embodiment.

FIG. 23 is a diagram showing operation example of a path changeover processing in the seventh embodiment. As shown in FIG. 23, in the network NW, when there is only connected a SoftPVC path in which the ATM node A is the call-out node, the ATM node D is the call-in node, and each ATM node B, C is the relay node, it is assumed that maintenance of the transmission line (channel) between the ATM node B and ATM node C becomes necessary.

In this case, the NMS 1 obtains the connection information associated with the path held by the ATM node B from the ATM node B, by the method described in the fifth embodiment or the sixth embodiment, and stores the information in the path information DB 41.

The manager of the network NW refers to the path information DB 41 and the topological information of the network DB 9, and grasps the route of "ATM node A→ATM node E→ATM node D" as the route from the ATM node A to the ATM node D without passing through the ATM node B.

Then, the manager inputs an instruction to change the currently connected route "ATM node A→ATM node B→ATM node C→ATM node D" to the alternative route of "ATM node A→ATM node E→ATM node D" to the NSM 1.

Figure 24:
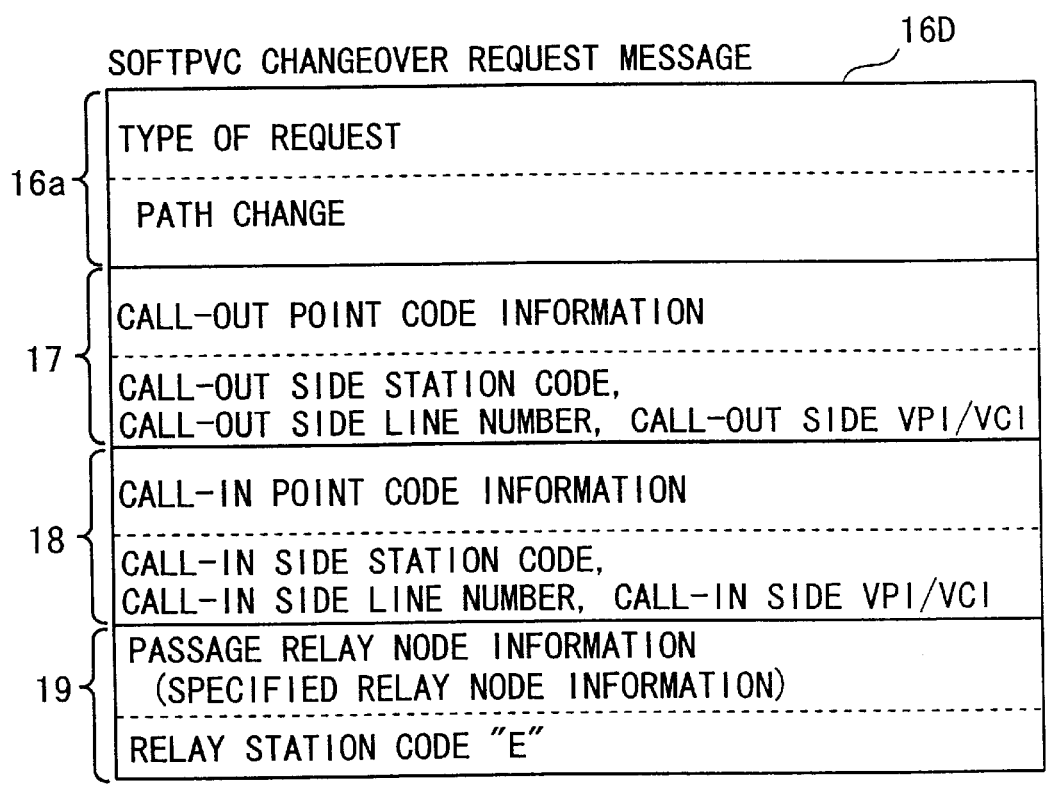
FIG. 24 is a format diagram of a SoftPVC changeover request message in the seventh embodiment.

Thereafter, the CPU 4 of the NMS 1 prepares a SoftPVC changeover request message 16D. FIG. 24 is a format diagram of message 16D. The message 16D has each field 16a, 17, 18 and 19. The field 16a retains "path changeover" as a kind of request. The field 17 retains the point code information of the call-out node in the alternative route. The field 18 retains the point code information of the call-in node in the alternative route.

Moreover, the field 19 retains the station code of the ATM node specified as the relay node in the alternative route, as the specified relay node information. As described above, the message 16D is the same as the message 16 described in the first embodiment, except that the content of the kind of request is different. In this example, the point code information of the ATM node A is stored in the field 17, and the point code information of the ATM node D is stored in the field 18. Also, the station code of the ATM node E as the specified relay node is stored in the field 19.

Figure 25:
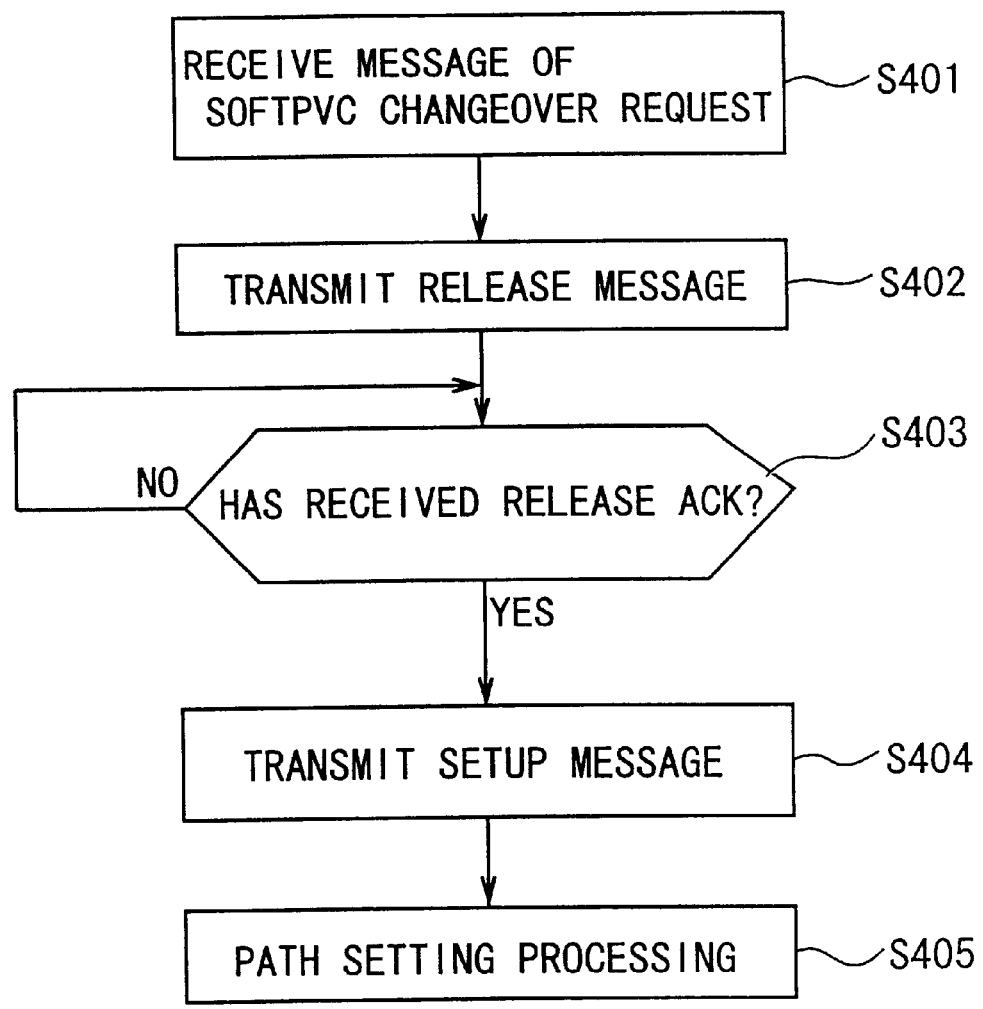
FIG. 25 is a flowchart for explaining the operation of a call-out node in the seventh embodiment.

When the message 16D is prepared, the NMS 1 transmits the message 16D to the ATM node A as the call-out node. Upon reception of the message 16D from the NMS 1, the ATM node A executes the operation according to the flowchart shown in FIG. 25. FIG. 25 is a flowchart showing the operation (processing) of the call-out node in the seventh embodiment.

In FIG. 25, when the ATM node A as the call-out node receives the message 16D (step S401), the control section 10A of the ATM node A prepares the RELEASE message 42 for cutting off the SoftPVC path currently connected. The control section 10A transmits the prepared RELEASE message 42 to the adjacent node that is to receive the message 42 (step S402).

Figure 26:
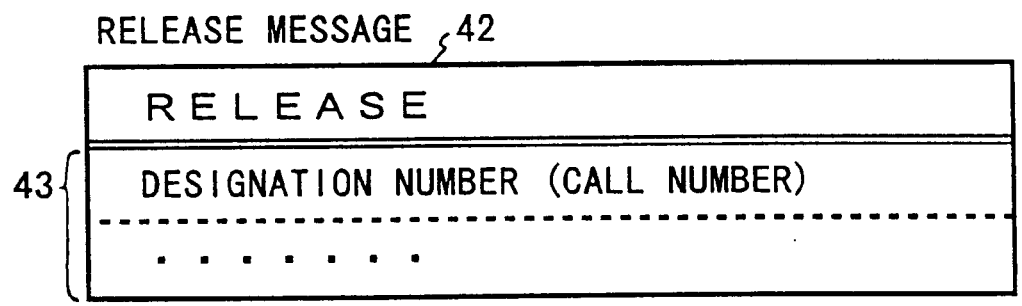
FIG. 26 is a format diagram of a RELEASE message in the seventh embodiment.

FIG. 26 is a format diagram of the RELEASE message 42. The RELEASE message 42 has a field 43. The field 43 retains the designation number of a path to be released.

The RELEASE message 42 is transmitted from the ATM node A to the ATM node B, by the step S402. Thereafter, the ATM node A is in a state waiting for the RELEASE ACK message as a completion advice of the path release processing transmitted from each ATM node B, C, D (receive standby) (step S403).

On the other hand, upon reception of the RELEASE message 42, the ATM node B transmits the received message 42 to the ATM node C, as well as releasing the path between the ATM node A and the ATM node B.

Thereafter, the RELEASE message 42 is transmitted to the ATM node D via the ATM node C, and the path between the ATM node B and the ATM node C, and the path between the ATM node C and the ATM node D are respectively released. The respective ATM node B, C and D receive the RELEASE message 42, and upon release of the corresponding path, transmit the RELEASE ACK message to the ATM node A.

Upon reception of the RELEASE ACK message from each ATM node B, C and D (step S403: Y), the ATM node A prepares the SETUP message associated with the alternative route, and transmits the message to the adjacent node (step S404). That is to say, the ATM node A prepares the SETUP message shown in FIG. 27.

Figure 27:
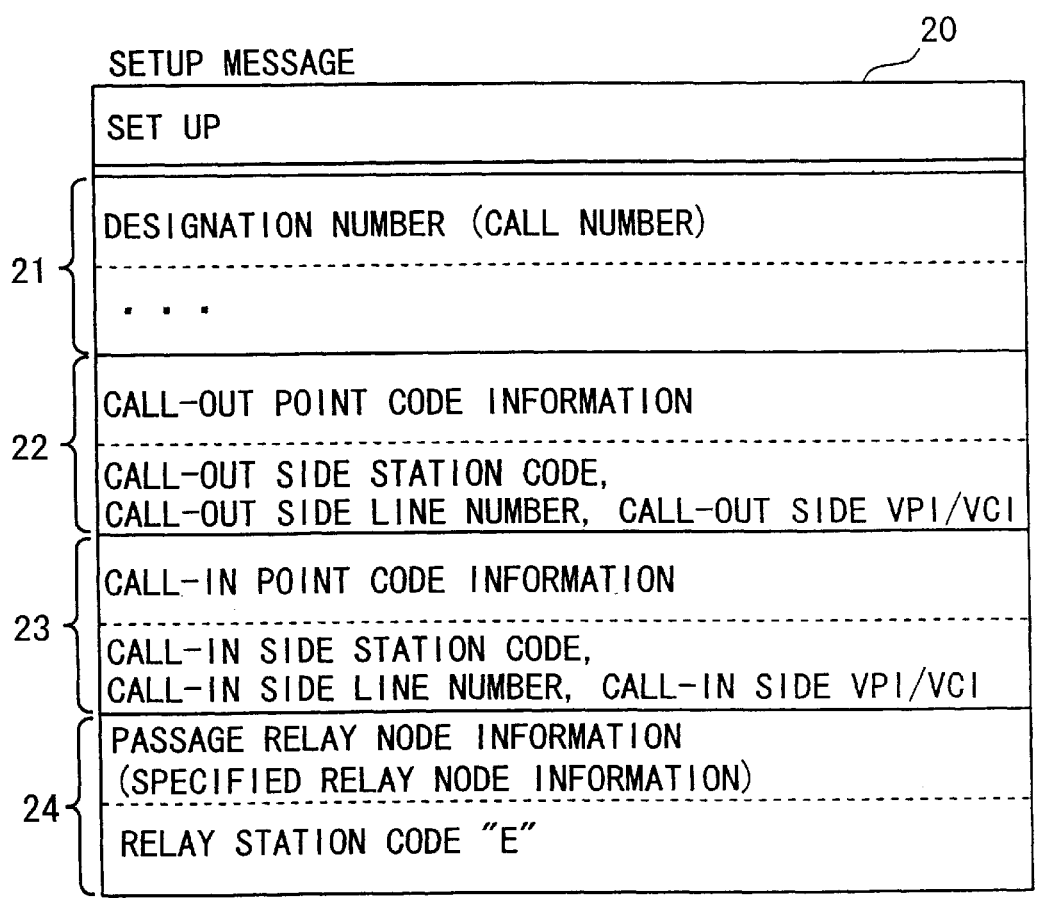
FIG. 27 is a format diagram of a SETUP message in the seventh embodiment.

The SETUP message shown in FIG. 27 is the same as the SETUP message 20 described in the first embodiment (see FIG. 7). However, in the field 24 of the SETUP message 20, there is stored the station code of the ATM node E corresponding to the relay node of the alternative route, as the passage relay node information (specified relay node information).

The ATM node A transmits the SETUP message 20 to the ATM node E, as well as setting a path between the ATM node A and the ATM node E (step S405).

Thereafter, upon reception of the SETUP message 20, the ATM node E executes the processing similar to that of the relay node in the first embodiment (see FIG. 8), and transmits the SETUP message 20 to the ATM node D, as well as setting a path between the ATM node E and the ATM node D.

In this manner, after the SETUP message 20 is transmitted from the ATM node A as the call-out node, a path designating only the ATM node E as the relay node between the ATM node A and the ATM node D is set by the method described in the first embodiment. Thereafter, the manager of the network NW can perform maintenance work for the line connecting the ATM node B and the ATM node C.

(Effects of the Seventh Embodiment)

Conventionally, when a maintenance work of the relay channel is performed, the following processing has been performed. That is to say, the concerned channel is made to a failure state or maintenance blockage state. As a result, a node accommodating the concerned channel detects the channel failure, thereby an OAM cell such as VC-AIS is automatically given to the call-out node with respect to the connection accommodated in the concerned channel, and the call-out node resets the path in a route bypassing the channel where a failure has been detected.

As described above, when the maintenance work is performed, a failure is intentionally generated in the relay channel to be subjected to the maintenance work. Accordingly, the service is interrupted until the path is reset by the failure detection. The interrupted time may be several ten minutes, depending on the number of paths set in the relay channel to be subjected to the maintenance work.

According to the seventh embodiment, when the message 16D for the SoftPVC changeover request is transmitted once from the NMS 1 to the call-out node, in the network NW, the release processing of the old SoftPVC path is executed, and a SoftPVC path associated with the alternative route is newly connected.

As a result, by the route change of the SoftPVC, it is not necessary for the manager of the network NW to perform path setting manually with respect to each ATM node existing on the alternative route, in order to connect the path in the alternative route.

Therefore, when it becomes necessary to perform maintenance work of a node or channel, if an alternative path bypassing the maintenance part is set by the method according to the seventh embodiment, an alternative path passing through the intended route can be easily set.

Then, after the path to be subjected to the maintenance work is changed over to the alternative path, the maintenance work may be performed to the node or channel to be subjected to the maintenance work. As a result, the time that the service is interrupted can be suppressed to a short period of time (for example, within one second).

According to the seventh embodiment, the whole connection information using the ATM node to be subjected to the maintenance work is extracted from the connection information DB 41 of the SoftPVC held by the NMS 1, a route that does not pass through the ATM node to be subjected to the maintenance work is extracted from the topological information of the network DB 9, and the concerned route information is stored in the SoftPVC changeover request message 16D, and the message 16D (Alternative Route setting request) is transmitted to all ATM nodes that are call-out nodes of the corresponding paths. Then, in the network NW, the connection using the ATM node to be subjected to the maintenance work is released, and a path of the alternative route is set by the method according to the first embodiment.

In the seventh embodiment, a message 16D including the specified relay node information described in the first embodiment is prepared. Instead, a message 16D including the specified relay node information described in the second embodiment may be transmitted to the call-out node, thereby the call-out node, the relay node and the call-in node respectively set a path associated with the alternative route by a method similar to the method described in the second embodiment (see FIGS. 11, 12).

Alternatively, a message 16D including the specified non-passage node information described in the third embodiment may be transmitted to the call-out node, thereby the call-out node, the relay node and the call-in node respectively set a path associated with the alternative route by a method similar to the method described in the third embodiment (see FIGS. 13 to 15).

Alternatively, a message 16D including the specified non-passage node information described in the fourth embodiment may be transmitted to the call-out node, thereby the call-out node, the relay node and the call-in node respectively set a path associated with the alternative route by a method similar to the method described in the fourth embodiment (see FIGS. 17 to 19).

What is claimed is:

1. A network system comprising:

a network having a plurality of nodes; and a control unit for this network, wherein said network has a plurality of routes from a call-out node via an relay node to a call-in node;

said control unit provides to the call-out node a path connection request having node information stored therein, when the call-out node and the call-in node are to be connected, passing through at least one node, said node information comprising information associated with the call-out node, information associated with the call-in node, and information associated with a specified relay node specified as a node for the path to pass therethrough;

said call-out node generates a path connection start request comprising the node information in the path connection request, upon reception of the path connection request from said control unit; and transmits the path connection start request to the adjacent node so that the specified relay node receives the path connection start request, based on the information associated with the specified relay node, as well as setting a path with the adjacent node; and said each node, when receives the path connection start request, if there is a specified relay node which has not received the path connection start request, transmits the path connection start request to the adjacent node so that said specified relay node receives the path connection start request, based on the information associated with said specified relay node, and if all of the specified relay nodes have received the path connection start request, said each node transmits the path connection start request to the adjacent node so that the call-in node receives the path connection start request based on the information associated with the call-in node, to thereby set a path with the adjacent node that has transmitted the path connection start request.

2. A network system according to claim 1, wherein
the information associated with the specified relay node includes information associated with the specified output line as the output line specified to be used,
said each node, when receives the path connection start request, if there is information associated with the own specified relay node, sets a path with the adjacent node, using the specified output line, and transmits the path connection start request to said adjacent node.

3. A network system according to claim 2, wherein
said each node, when there is no information associated with the own specified relay node, and if there is a specified relay node that has not received the path connection start request, transmits the path connection start request to the adjacent node so that the specified relay node receives the path connection start request, based on the information associated with the specified relay node, and if all of the specified relay nodes have received the path connection start request, said each node transmits the path connection start request to the adjacent node so that the call-in node receives the path connection start request based on the information associated with the call-in node, to thereby set a path with the adjacent node that has transmitted the path connection start request.

4. A network system comprising:
a network having a plurality of nodes and a control unit for this network,
wherein said network has a plurality of routes from a call-out node via an relay node to a call-in node;
when the call-out node and the call-in node are connected without passing through at least one specific node, said control unit provides to the call-out node a path connection request having node information stored therein, comprising: information associated with the call-out node; information associated with the call-in node; and information associated with a specified non-passage node specified as a specific node through which the path does not pass;
said call-out node, when receives the path connection request from the control unit, generates a path connection start request comprising the node information in the path connection request, and transmits the path connection start request to the adjacent node that does not correspond to said specified non-passage node based on the information associated with the specified non-passage node, as well as setting a path with the adjacent node; and
said each node when receives the path connection start request, if there is an adjacent node corresponding to the call-in node, transmits the path connection start request to the adjacent node, and if there is an adjacent node which does not correspond to the call-in node and the specified non-passage node, said each node transmits the path connection start request to the adjacent node, and sets a path with the adjacent node that has transmitted the path connection start request.

5. A network system according to claim 4, wherein
said call-out node, if there is no adjacent node that does not correspond to the specified non-passage node, rejects the path connection request.

6. A network system according to claim 4, wherein
said relay node, if the path connection start request can be transmitted only to the adjacent node corresponding to the specified non-passage node, rejects this path connection request.

7. A network system according to claim 4, wherein
the information associated with said specified non-passage node includes information associated with the specified non-passage channel as the output line through which the path of the specified non-passage node does not pass;
said call-out node, if there is no adjacent node that does not correspond to the specified non-passage node, transmits the path connection start request to the adjacent node corresponding to the specified non-passage node; and
said each node when receives the path connection start request, if the own specified non-passage node information is included in the path connection start request, transmits the path connection start request to an adjacent node corresponding to the call-in node or an adjacent node that does not correspond to the specified non-passage node, using an output line other than the specified non-passage channel, as well as setting a path with said adjacent node.

8. A network system according to claim 7, wherein
said each node, when only the specified non-passage channel can be used, transmits a message informing that the path cannot be set to the call-out node.

9. A network system according to claim 7, wherein
said each node, when the own specified non-passage node information is not included in the received path connection start request, and if there is an adjacent node corresponding to the call-in node, transmits the path connection start request to said adjacent node, and if there is no adjacent node corresponding to the call-in node, and if there is an adjacent node that does not correspond to the specified non-passage node, said each node transmits the path connection start request to said adjacent node, and if there is no adjacent node corresponding to the call-in node and no adjacent node not corresponding the specified non-passage node, said each node transmits the path connection start request to the adjacent node corresponding to the specified non-passage node, to thereby set a path with the adjacent node that has transmitted the path connection start request.

10. A network system according to claim 1, wherein
said management unit obtains the information associated with the path set from the call-out node to the call-in node.

11. A network system according to claim 10, wherein
said call-out node obtains the information associated with the path from each relay node existing on said path, and provides said information to said management unit.

12. A network system according to claim 10, wherein
said each node, when setting a path with the adjacent node in response to the path connection start request, retains the information associated with said path; and
said management unit urges each relay node existing on said path to transmit the information associated with the path, and obtains the information associated with the path transmitted from each relay node.

13. A network system according to claim 1, wherein
said management unit, in the case of changing the set path, provides to the call-out node a path changeover request having alternative node information stored therein, comprising information associated with the call-out node; information associated with the call-in node; and information associated with a specified relay node of an alternative path;

said call-out node cuts off the set path by transmitting a release message towards the call-in node, and prepares a path connection start request of the alternative path comprising the alternative node information; and said respective nodes comprising said call-out node execute the processing according to claim 1 in response to the path connection start request of said alternative path, to thereby set the alternative path passing through the specified relay node.

14. A network system according to claim 13, wherein the information associated with said specified relay node includes the information of the specified output line, as the output line specified to be used, said each node, when receives the path connection start request, if there is information associated with the own specified relay node, sets a path with the adjacent node, using the specified output line, and transmits the path connection start request to said adjacent node, to thereby set an alternative path passing through the specified output line of the specified relay node.

15. A network system according to claim 4, wherein said management unit, in the case of changing the set path, provides to the call-out node a path changeover request having alternative node information stored therein, comprising information associated with the call-out node; information associated with the call-in node; and information associated with a specified relay node of an alternative path;

said call-out node cuts off the set path by transmitting a release message towards the call-in node, and prepares a path connection start request of the alternative path comprising the alternative node information; and said respective nodes comprising said call-out node execute the processing according to claim 4 in response to the path connection start request of said alternative path, to thereby set the alternative path that does not pass through the specified relay node.

16. A network system according to claim 15, wherein the information associated with said specified non-passage node includes the information of the specified non-passage channel, as the output line through which the path does not pass;

said call-out node, if there is no adjacent node that does not correspond to the specified non-passage node, transmits the path connection start request to the adjacent node corresponding to the specified non-passage node; and said each node, when receives the path connection start request of said alternative path, if the own specified non-passage node information is included in the path connection start request of said alternative path, transmits the path connection start request of said alternative path to an adjacent node corresponding to the call-in node or an adjacent node that does not correspond to the specified non-passage node, using an output line other than the specified non-passage channel, as well as setting a path with said adjacent node, to thereby set an alternative path that does not pass through the specified non-passage channel of the specified non-passage node.

* * * * *